United States Patent
Turner et al.

3,737,858
June 5, 1973

[54] VERSATILE TELEMETERING SYSTEM

[75] Inventors: Loyce A. Turner, Smyrna; Edward A. Rollor, Jr., Marietta, both of Ga.

[73] Assignee: Advanced Research Corporation, Atlanta, Ga.

[22] Filed: July 13, 1971

[21] Appl. No.: 162,111

[52] U.S. Cl. ............340/151, 178/69.5, 179/15 FD, 340/183, 340/203, 340/324 A
[51] Int. Cl. .................................................H04q 9/1
[58] Field of Search .................340/203, 204, 150, 340/151, 163, 183, 212, 324 A, 324 AD, 171 R; 179/15 FD; 178/69.5; 335/205

[56] References Cited

UNITED STATES PATENTS

| | | | |
|---|---|---|---|
| 3,266,018 | 8/1966 | Higgins | 340/151 |
| 3,164,771 | 1/1965 | Milford | 340/151 |
| 3,445,814 | 5/1969 | Spalti | 340/151 |
| 3,210,498 | 10/1965 | Jackson et al. | 335/206 |
| 3,579,252 | 5/1971 | Goodman | 178/7.85 |
| 3,179,931 | 4/1965 | Middaugh | 340/163 |
| 3,179,883 | 4/1965 | Farrow | 340/324 AD |
| 3,268,814 | 8/1966 | Duvivier | 340/183 |

*Primary Examiner*—John W. Caldwell
*Assistant Examiner*—Robert J. Mooney
*Attorney*—Rose & Edell

[57] ABSTRACT

A telemetering system permits multiple functions to be monitored in response to each interrogation pulse by utilizing multiple sets of reply frequencies to distinguish between simultaneous reply pulses. The status of the various functions is displayed on a color television screen segmented into a grid wherein the color of each grid location represents the status of a respective monitored function. Remote utility meter reading is effected using a single reply pulse per interrogation by monitoring only one dial of a multiple-dial meter for intervals of angular motion of the indicator and updating a total accumulated count at the central station each time a unit of fractional revolution is sensed. In a preferred embodiment, telemetering is effected via a coaxial cable dedicated solely to the telemetering system.

33 Claims, 37 Drawing Figures

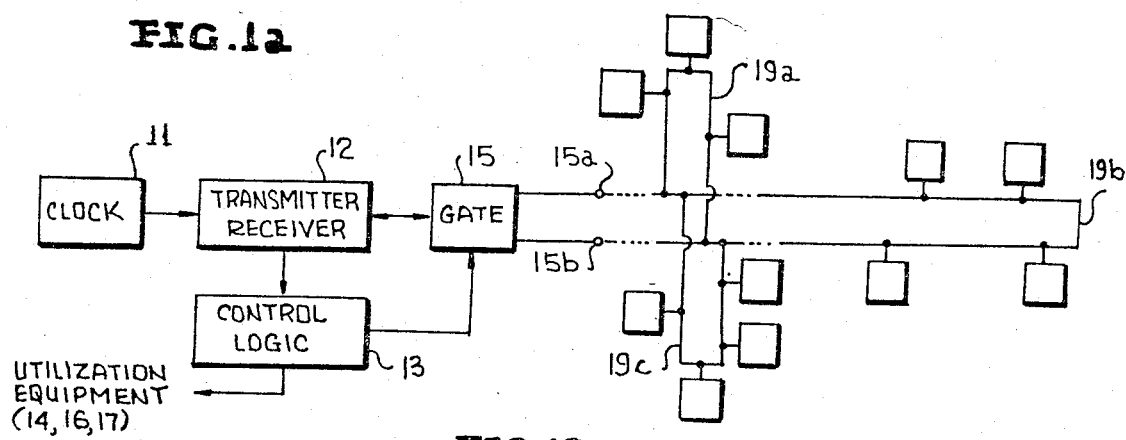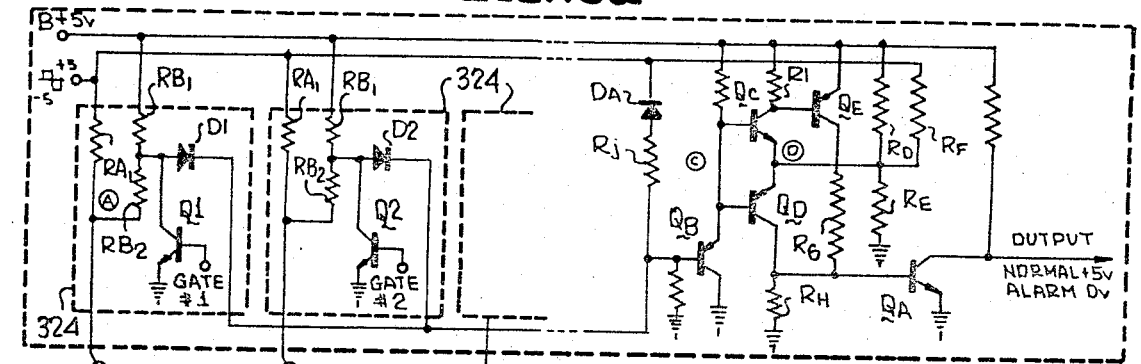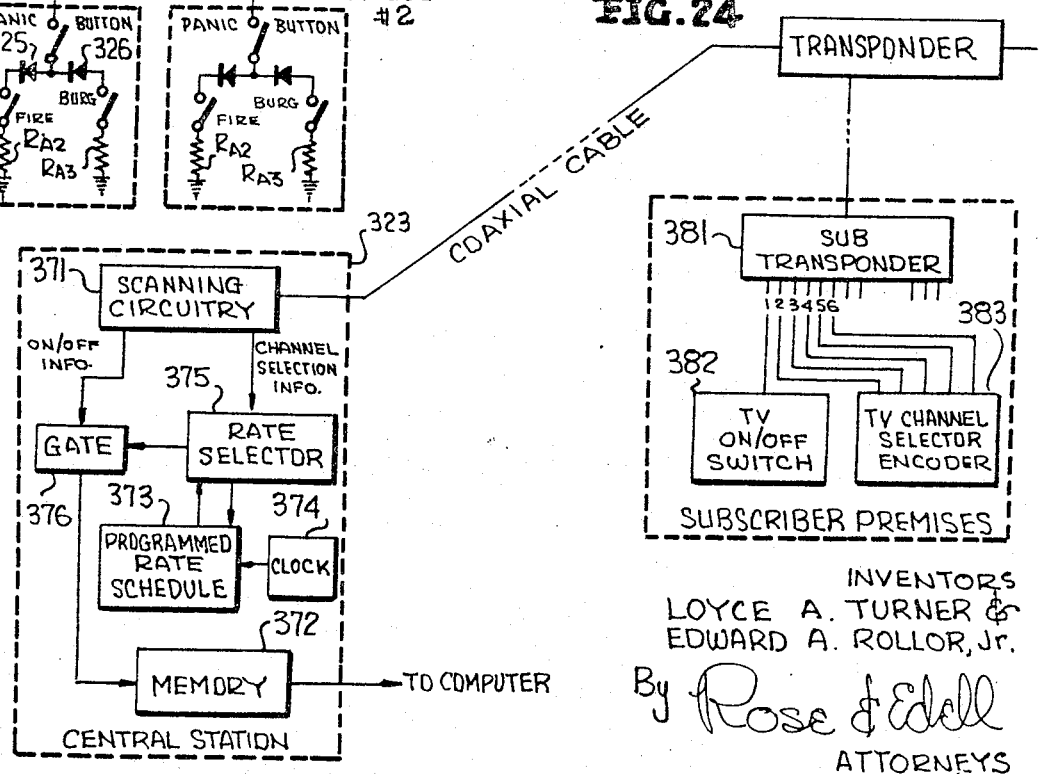

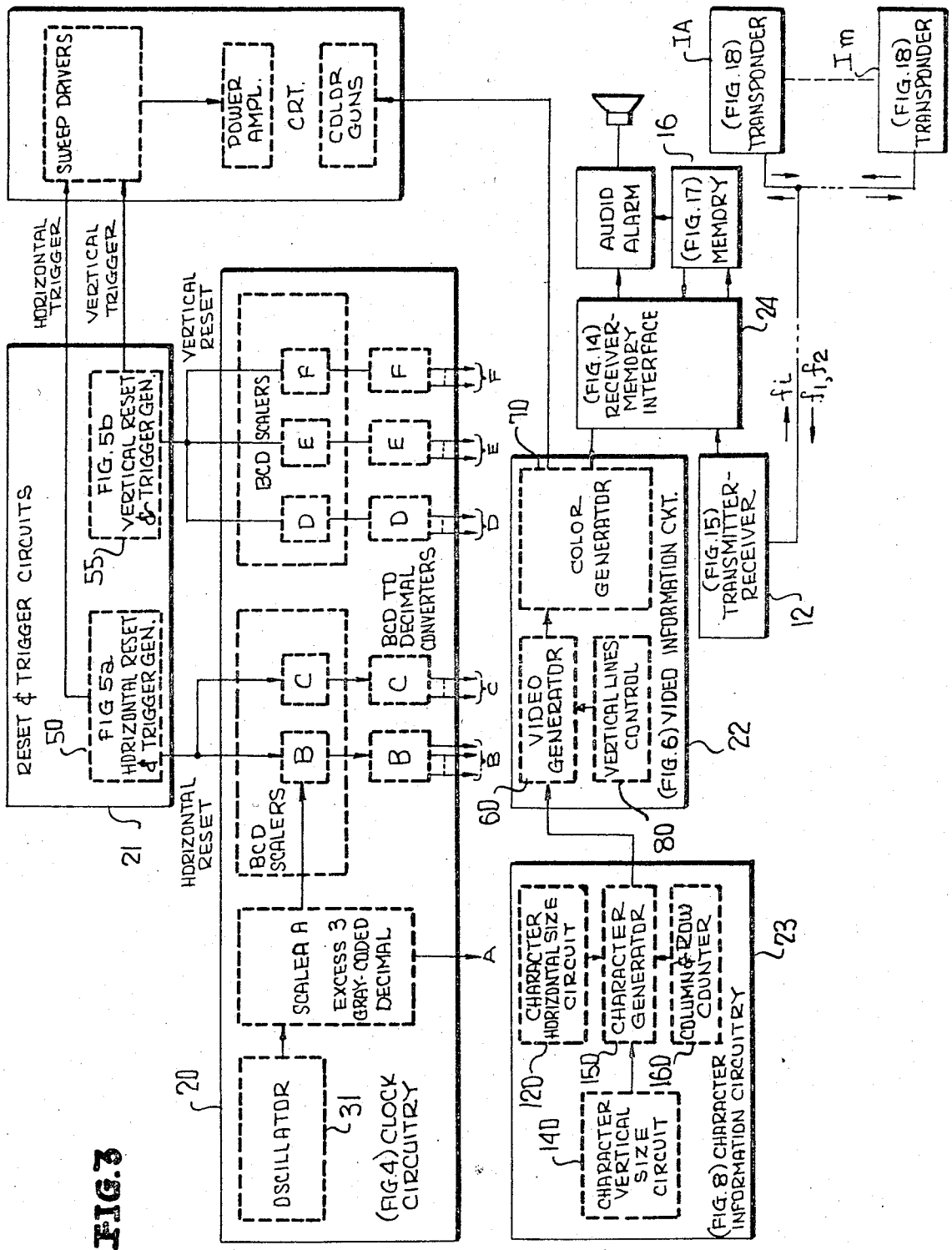

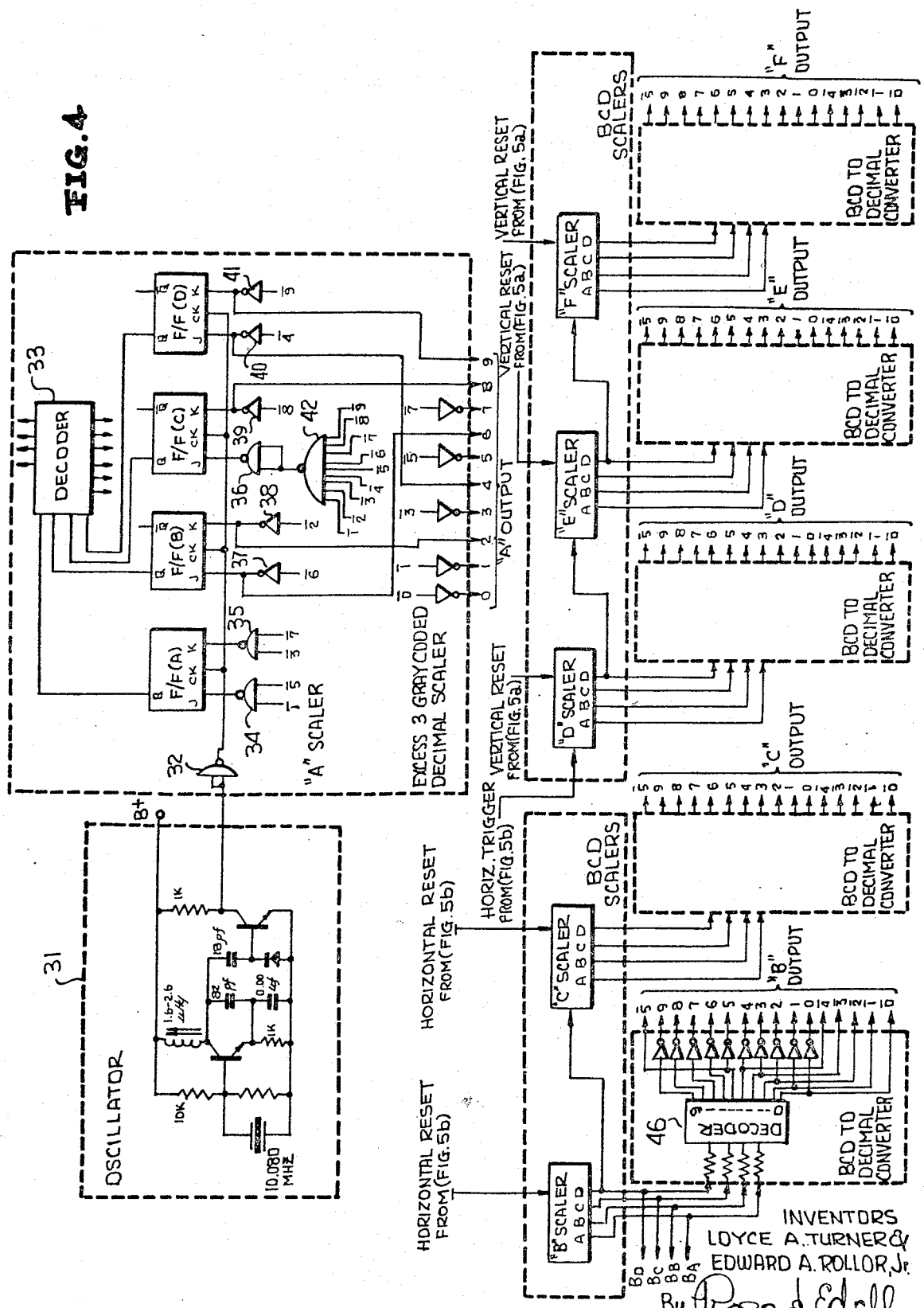

INVENTORS
ROYCE A. TURNER &
EDWARD A. ROLLOR, Jr.

By Rose & Edell
ATTORNEYS

Patented June 5, 1973

INVENTORS
LOYCE A. TURNER &
EDWARD A. ROLLOR, Jr.

By Rose & Edell

ATTORNEYS

Patented June 5, 1973

INVENTORS
LOYCE A. TURNER &
EDWARD A. ROLLOR, Jr.

By Rose & Edell

ATTORNEYS

Patented June 5, 1973

INVENTORS
LOYCE A. TURNER &
EDWARD A. ROLLOR, Jr.
By Rose & Edell
ATTORNEYS

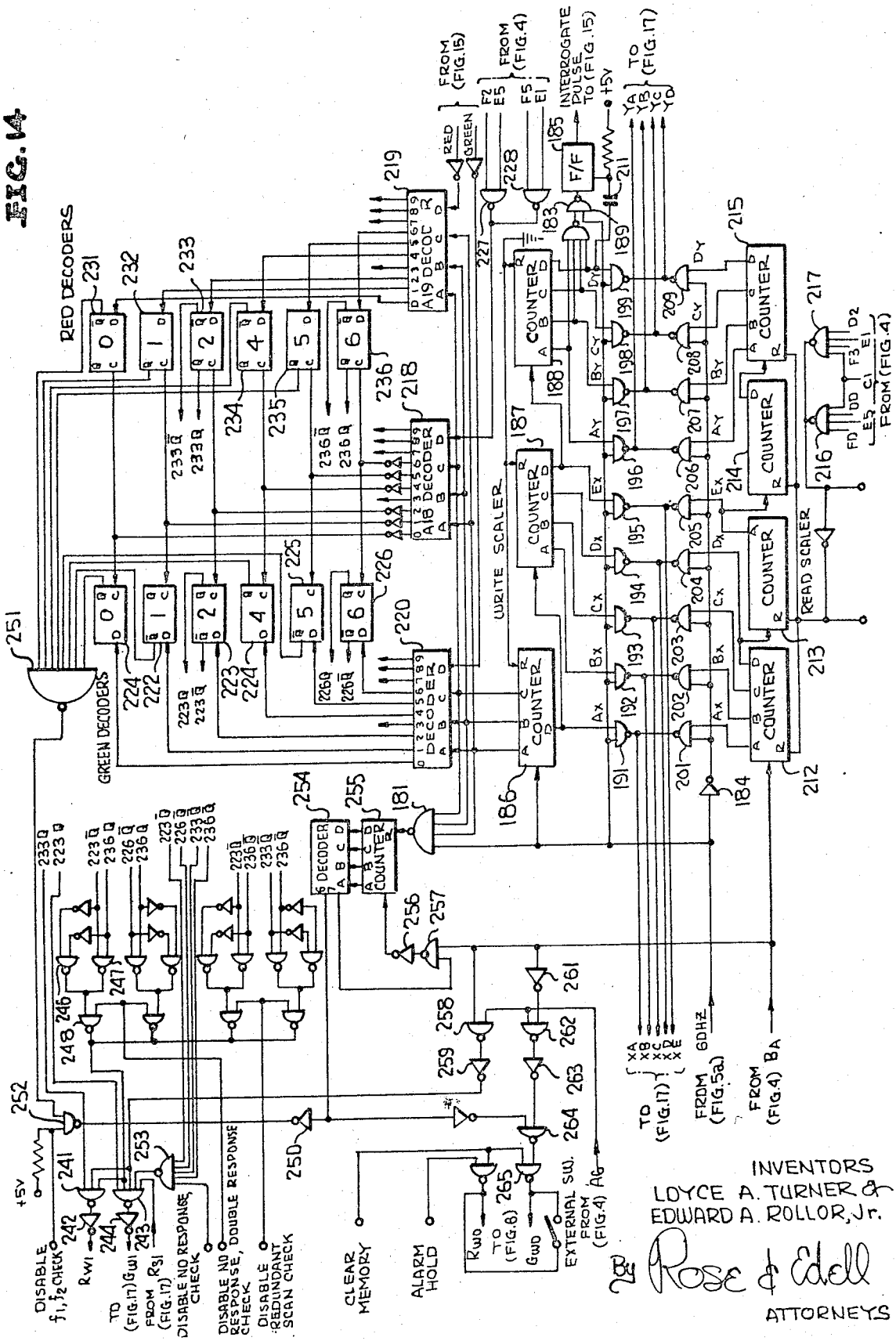

Patented June 5, 1973
3,737,858
17 Sheets-Sheet 15
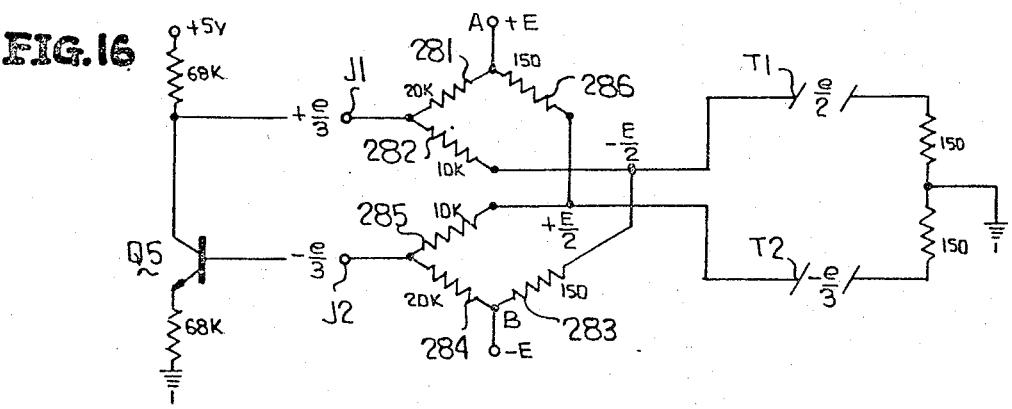
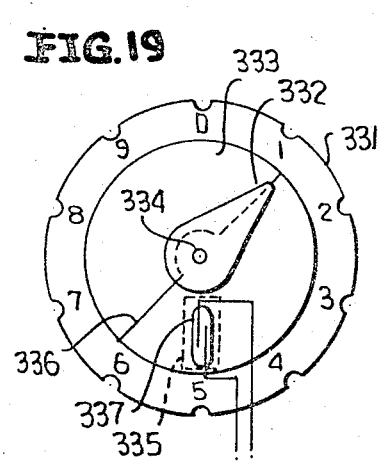
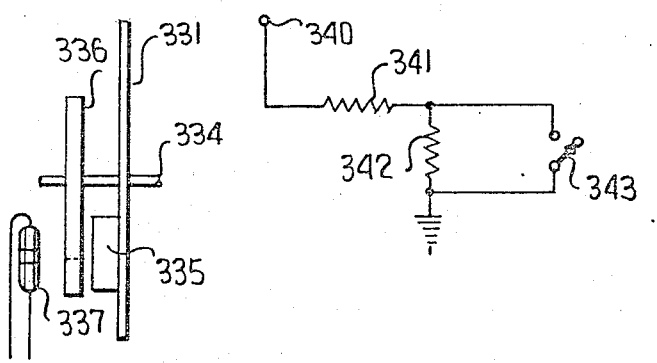
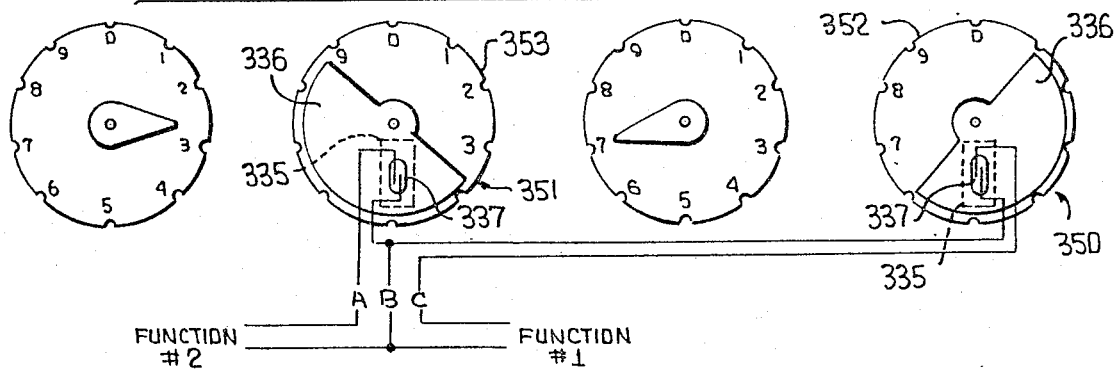
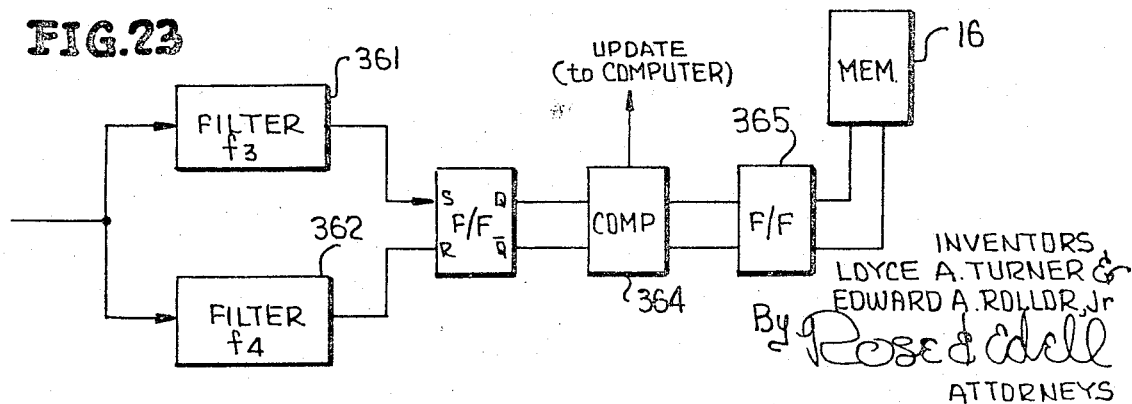

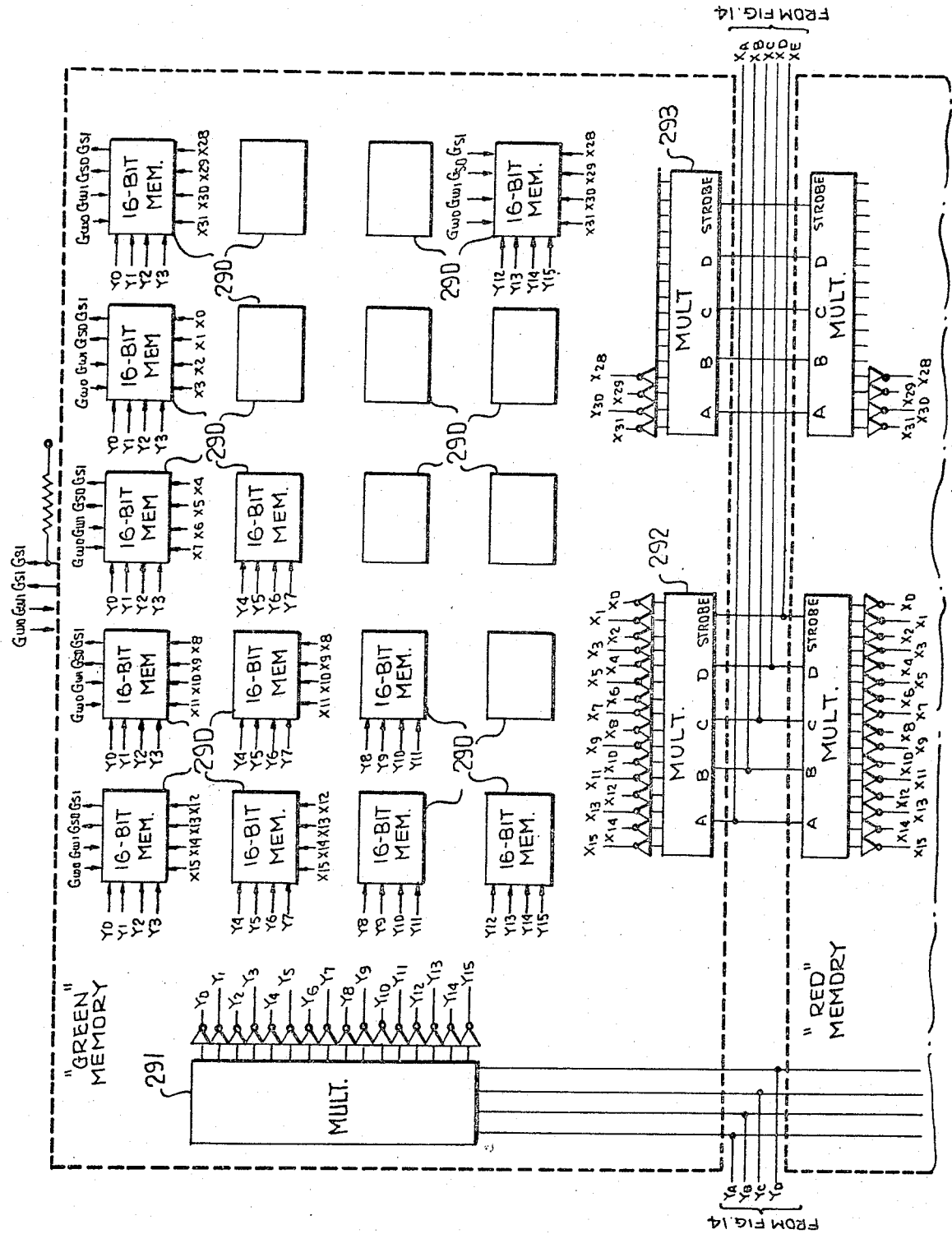

VERSATILE TELEMETERING SYSTEM

BACKGROUND OF THE INVENTION

The present invention relates to remote monitoring communication (telemetering) systems of the type wherein a control station interrogates remote and diversely located stations to ascertain the condition of specified monitored functions. More specifically, the present invention relates to improving the versatility of such systems whereby the number and type of monitored functions may be significantly increased and expeditiously interpreted at relatively small expense.

Some prior art telemetering systems of the type with which the present invention is concerned include individual connections from each remote location to the central station. Other systems employ some form of time sharing or multiplexing to make use of a common transmission path between the central station and all of the remote locations. The latter type system is usually more economical than the former but is generally limited regarding the number of remote parameters which can be monitored. Specifically, the time sharing system requires the central station to transmit a series of coded interrogate signals, each signal in the series identifying a respective monitored parameter. A transponder for the remote parameter decodes the interrogate signals and responds for its monitored parameter by transmitting back to the central station a signal representing the status of the parameter. In many instances, the time permitted between interrogations of a given parameter is limited by considerations of accuracy, security, or the like, thereby limiting the total number of parameters which can be monitored in a complete interrogation cycle. In some cases, where the system is controlled by or interfaces with a time-shared general purpose computer, computer time is limited, thereby limiting the number of parameters which can be effectively monitored by the system.

It is therefore one object of the present invention to provide a telemetering system of the type employing multiplexing techniques wherein a much greater number of parameters can be measured in a complete interrogation cycle than was possible in the prior art. It is another object of the present invention to increase the capacity of a multiplexed telemetering system without unduly increasing the cost and complexity of the interrogation equipment.

Another problem area in prior art telemetering systems concerns the medium by which information is transmitted. Some systems employ radio transmission; however federal regulations limiting broadcast band availability severely restrict the quantity and type of data which can be effectively transmitted. Other systems employ individual wire pairs for each transponder; this approach, however, is quite expensive where large numbers of transponders are employed, the expense resulting from the necessity of laying and connecting the many wire pairs required. In addition, the individual wire pair approach has the problem of limited frequency response.

Another approach to data transmission in telemetering systems is the shared utilization of existing telephone lines. This approach has the disadvantages of leasing expense, poor frequency response, and the fact that the lines (when carrying conversations) are not always available for data transmission. This, of course, severely limits the times during which remote meters may be interrogated.

Still another approach to data transmission in telemetering systems is the sharing of an existing CATV coaxial cable. At the present time, however, this approach requires some compromise in performance of the television transmission system, and exposes the data transmission system to failures in the CATV system. Although the present invention can be employed in this manner, it is ideally suited for use with a special coaxial cable, requiring no active devices directly to the signal path. This can be an extremely important factor in transmission of emergency alarms, wherein protection of human life is involved.

It is therefore another object of the present invention to provide an approach to transmitting interrogation and data signals in a telemetering system wherein the disadvantages attendant with prior art signal transmissions can be substantially eliminated without undue expense.

Another problem in prior art telemetering systems relates to the monitoring of remote alarms and particularly to the display of alarm conditions. Most central station alarm systems are rather large and complicated, usually employing a meter or a plurality of lamps for each alarm function. Alternatively, only a single alarm indication is provided and the central station operator is required to actuate a series of controls to identify the location of an indicated alarm condition.

It is a further object of the present invention to provide a novel compact display arrangement for a telemetering system wherein the current status of each of a multiplicity of monitored functions is clearly indicated and identified.

Many prior art telemetering systems have been designed to effect remote reading of utility meters or similar meters which monitor a continuously increasing parameter. Unfortunately, these prior art systems have not been sufficiently compatible with central station alarm telemetering systems to permit both types of functions to be efficiently monitored by a common system. Moreover, and apart from compatability with alarm monitoring systems, prior art remote utility meter reading has been fraught with the disadvantages of expensive and complex decoding circuitry. For example, prior art approaches to remotely monitoring residential electric power meters have required a complex decoder at each remote location to convert the reading of all four meter dials into a form suitable for transmission back to the central station. The coded reading is then transmitted, usually in the form of multiple binary signals, to appropriate decoding circuitry at the central station. Where the multiple binary signals are in parallel form, many individual lines, connections, and circuits are required at the remote location. Where the multiple binary signals are in serial form, complex circuitry is required at the remote location; but possibly more important is the fact that precious time is consumed in transmitting the serial information for each parameter, thereby limiting the number of parameters which can reasonably be monitored in a limited interrogation cycle.

One prior art approach for simplifying data transmission of remote meter readings is described in U.S. Pat. No. 3,445,814. The problem with that approach however is its lack of adaptability to presently employed utility meter mechanisms and its requirement for considerable modification with additional mechanical structure at the remote location.

It is therefore an object of the present invention to effect efficient remote meter reading of existing utility meter types with a minimum of equipment at the remote location. Specifically, it is an object of the present invention to provide an approach to remote meter reading wherein only a single bit need be transmitted from the remote location to indicate the status of the meter at that location.

SUMMARY OF THE INVENTION

In accordance with one aspect of the present invention, a central station transmits a series of pulses of an interrogate frequency signal to multiple remote channels, preferably, though not necessarily, via a coaxial cable dedicated to the telemetering system. Each channel includes one or more transponders which count the interrogate frequency pulses and which are responsible for monitoring the state of one or more parameters. The monitored parameters in each channel are assigned numbers in a series corresponding to the series of interrogate pusles. The transponder sends back a pulse of either a first reply frequency signal or a second reply frequency signal according to the state of the monitored parameter having an assigned number corresponding to the current interrogate pulse. Each channel utilizes a different set of reply frequencies to permit maximum utilization of the range/frequency characteristics of the transmission medium. The reply pulses are transmitted, preferably, though not necessarily, via the dedicated coaxial cable to the central station where filters are provided to sort simultaneously received reply pulses according to the frequency of the pulsed signal.

In accordance with another aspect of the present invention a compact data display comprises a color television monitor having a viewing screen which is segmented into a grid of columns and rows. Each grid location represents a repective monitored parameter, the status of each parameter being represented by the color of its corresponding grid location.

In accordance with another aspect of the present invention, existing types of remote utility meters are monitored on an incremental basis whereby a switch is sequentially opened and closed for successive intervals of angular displacement of only one of the plural indicator dials of the meter. The telemetry system interrogates this parameter sufficiently often to preclude the possibility of the switch changing states more than once between interrogations. At the central station the current state of the switch is compared to the previous state and any change in state increments an accumulated count. The switch is preferably a magnetic reed placed on one side of an indicator dial, opposite a permanent magnet. A magnetic shield overlays half the dial permitting sequential opening and closing of the reed switch by the magnet for successive half cycles of the dial. Other means of producing a switch actuator related to rotation of the indicator dial are satisfactory, i.e., a cam actuated contact.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1a is a functional block diagram of a modified version of the system of FIG. 1;

FIG. 3 is a more detailed functional block diagram of the system of FIG. 1 as employed in conjunction with the display of FIG. 2;

FIG. 4, 5a, 5b, 6, 8, 9, 14, 15, 16, 17, 18 and 18a are more detailed schematic diagrams of various functional blocks illustrated in FIG. 3;

FIGS. 19 and 20 are front and side views, respectively, of a utility meter adapted for remote meter reading according to the present invention;

FIG. 21 is a simplified schematic representation of a typical transducer circuit capable of utilization with the telemetering system of the present invention;

FIG. 22 is a diagrammatic representation of a modified version of the remote meter reading approach of the present invention;

FIG. 23 is a block diagram illustrating circuitry at the central station which cooperates with the remote meter reading approach of the present invention; and FIG. 24 is a block diagram illustrating a portion of the system of FIG. 1 when employed to monitor pay TV billing information.

DESCRIPTION OF PREFERRED EMBODIMENTS

Figure 1:
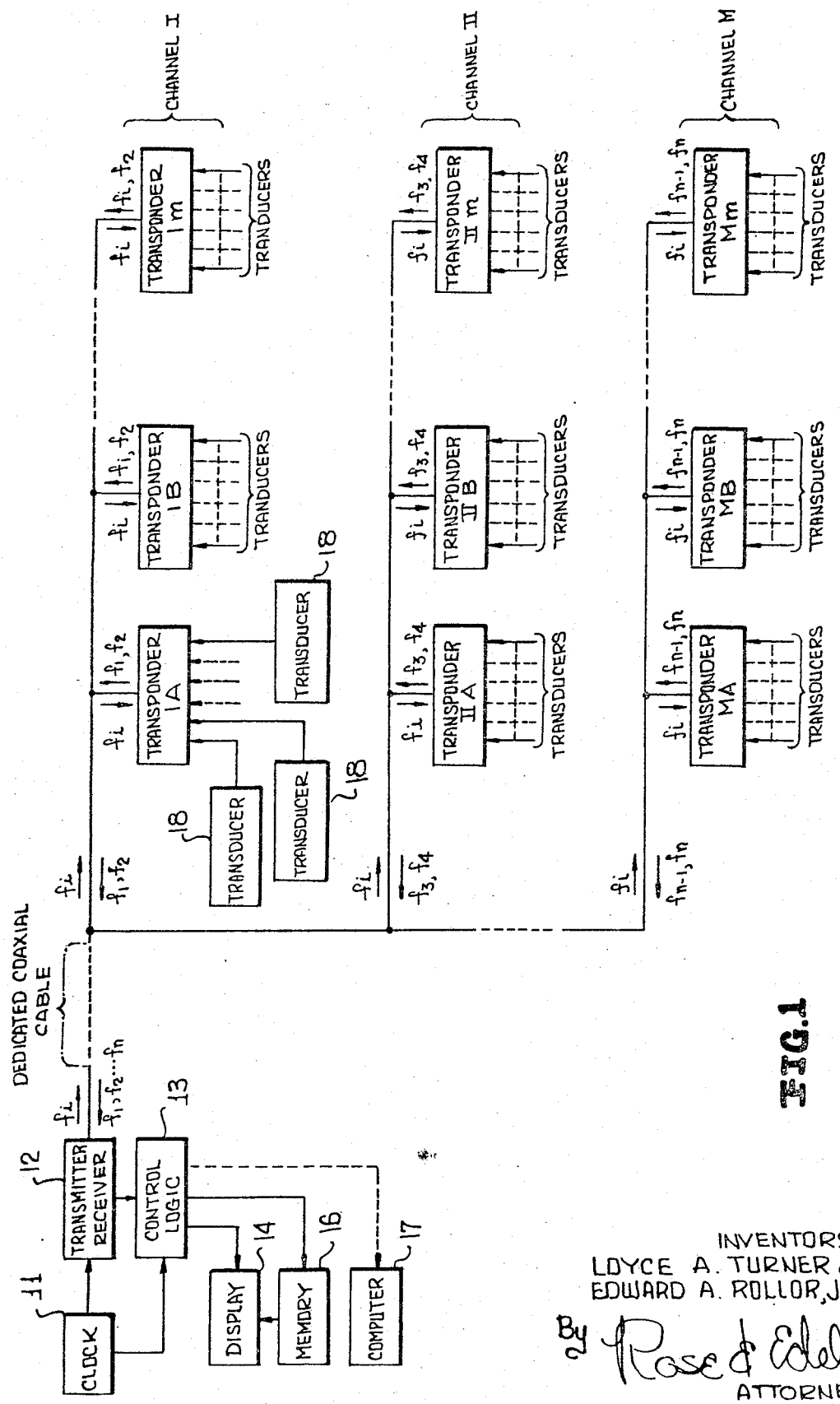
FIG. 1 is a functional block diagram of a telemetering system according to the present invention.

Referring specifically to FIG. 1, a telemetering system includes a central station and multiple remote transponders communicating via a signal transmission medium. For purposes of the system and components described below, the transmission medium may be multiple wire pairs, telephone lines, radio links, shared usage of a CATV cable, or any conventional electrical signal transmission medium. Preferably, however, the transmission medium comprises a separate coaxial cable dedicated solely to utilization by the telemetering system. Such a cable can be inexpensively installed, especially when installation is contemporaneous with a CATV cable. In addition, the primary advantage of the dedicated cable resides in the fact that the transmission medium is always available for telemetering system purposes. The coaxial cable is particularly advantageous relative to the multiple wire pair and telephone line approaches in that a much greater range of signal frequencies can be transmitted over the coaxial cable; further a relatively small cable can be selected to pass frequencies in the particular range desired for the telemetering system. The dedicated cable is also particularly advantageous relative to shared utilization of a CATV cable for the following reasons: (a) the telemetering system signals do not have to be tailored to prevent interference with television signals; (b) since telemetering signals are binary in nature, the extreme precautions required to prevent television "ghosts" resulting from line reflections are not necessary for the dedicated cable; (c) the dedicated cable may be laid out for optimization of telemetering signal transmission rather than for television signal transmission as in the CATV cable; (d) the dedicated telemetering system cable can transmit telemetering signals, with their more limited frequency range, over much greater distances than the CATV cable can transmit the wideband television signals, thereby permitting telemetering signal transmission with fewer or possibly no repeater amplifiers; and (e) the absence of repeater amplifiers greatly simplifies two-way transmission required in telemetering systems.

The central station, components of which are described in detail below, includes a clock circuit 11 which generates various timing signals for the system, the timing signals being applied to a transmitter-receiver unit 12 and a control logic circuit 13. Transmitter-receiver 12 includes an oscillator which generates an oscillatory signal having a frequency $f_i$, hereinafter referred to as the interrogate frequency. The oscillatory signal is pulsed at a relatively low rate to produce a series of interrogate pulses which are transmitted over the dedicated cable (or other transmission medium) to all of the transducers. Transmitter-receiver 12 also includes circuitry for receiving, via the transmission medium, reply pulses from the transponders, the reply pulses comprising pulses of oscillatory signals with frequencies other than $f_i$. Control logic circuit 13 counts interrogate pulses. In addition it processes the reply pulses received by the transmitter-receiver and converts the data represented by the reply signals into forms suitable for data display at display unit 14, for storage in data memory unit 16, or processing by a computer 17. The display unit 14 and memory unit 16 may, for example, be of the type described herein with reference to the system illustrated in FIG. 3. Alternatively or additionally, memory unit 17 may include the features described specifically in conjunction with meter reading approach illustrated in FIG. 23 wherein cooperation between the central station and a computer is described.

The transponders in FIG. 1 are arranged in groups, each group comprising one of channels designated I, II —M. The transponders in each channel are designated by the channel designation followed by a letter designation A, B,—m. It is the function of each transponder (e.g. — IA) to monitor the status of one or more transducers 18 and transmit to the central station a reply pulse indicating that status. To this end, each transducer 18 in channel I is assigned a different number. Each transponder includes a counter for counting interrogate pulses and a decoding circuit which initiates generation of a reply pulse when the interrogate pulse count is equal to a number assigned to one of its transducers. Thus, if the number three is assigned to a transducer monitored by transponder IA, the latter, in response to interrogate pulse three, will transmit a reply pulse to the central station to indicate the current status of transducer assigned number three in channel I. All of the transducers 18 associated with channel I have different assigned numbers; however, each channel has a similar series of numbers assigned to its transducers, so that transponders in different channels may provide reply pulses in response to the same interrogate pulse.

The reply pulses consist of pulsed oscillations wherein the frequency of the oscillations indicates the status of the associated transducer. For example, assuming all transducers to be bistable, the reply pulses from transponders IA through Im are pulsed oscillations having oscillation frequencies $f_1$ to represent one transducer state and $f_2$ to represent the other transducer state. To permit the central station to distinguish between two or more reply pulses received simultaneously from two or more channels, the pair of reply frequencies is different for each channel. Thus the transponders in channel II have reply frequencies of $f_3$ and $f_4$ to distinguish between the two transducer states, the transponders in channel M have reply frequencies $f_{2n-1}$ and $f_{2n}$, etc. No channel has the same reply frequency as any other channel.

Transmitter-receiver 12 at the central station includes a bandpass filter for each reply frequency in the system. When a particular reply pulse is received, its channel of origin is identified by its reply frequency and the transducer to which it pertains is represented by the current interrogate pulse count registered in control logic circuit 13. Since the transducer states are readily ascertained by their reply frequency, the states displayed at display 14 or stored in memory 16 can be updated once during each interrogate cycle. For present purposes it is assumed that an interrogate cycle includes a number of interrogate pulses which at least equals the maximum number of transducers associated with any channel. The interrogate pulse counters in control logic circuit 13 and in the transponders are, of course, re-cycled at the completion of each interrogate cycle.

The transducers as thus far described may represent any bistable monitored parameters, for example, fire alarms, burglar alarms, liquid levels, power overloads, etc. In addition, the meter reading function described herein may also be monitored by the system thus far described, it being necessary, of course, to provide additional central station equipment as described in relation to FIG. 23.

It will be appreciated that a transponder capable of providing either of two reply frequencies is actually capable of indicating any of four separate transducer states, since the transponder can be made to transmit no reply pulse or both reply frequencies when a transducer is polled. The central station can interpret these conditions as third and fourth states, or these states can be abnormal states and their occurrence used as a means of malfunction detection.

Apart from bistable transducers, the signal transmission approach described above may also be employed in conjunction with multistable transducers. For example, a parameter to be monitored may vary in any analog manner. The transducer for such parameter would include an analog to digital converter capable of rgistering plural discrete states corresponding to different analog parameter values. Suppose, for example, that such a transducer has 10 states. In that case, 10 different reply frequencies would be assigned to the channel with which that transducer is associated, and the reply frequency representing the status of that transducer would be any one of those 10. Alternatively, nine reply frequencies would suffice if a "no-response" mode of reply is utilized.

An analog parameter may also be monitored by utilizing a specified number (N) of the addresses assigned to the transponder for that parameter, and serially transmitting an N-bit binary representation of the parameter to the central station. For example, if the monitored parameter is flow, the analog output signal from a flow meter is fed to an analog-to-digital converter. The converter output signal is N-bits, thereby yielding $2^N$ increments in the measurement range of the flow parameter. The states of these N-bits are fed to N respective storage elements in the transponder and the measurement is transmitted as N serial reply pulses in response to N respective addresses assigned to the transponder. The N reply pulses are preferably generated in response to N consecutive addresses and represent the measured flow with a resolution dependent upon the choice of N.

The general approach outlined above permits many transducers (one in each channel) to be polled simultaneously. Consequently, the number of parameters which can be sampled by the system within a relatively short interrogate cycle is quite large. This is particularly advantageous where the interval between samplings of a parameter must be kept short.

The actual frequencies employed, of course, will vary according to the transmission medium. Where wire pairs are utilized, interrogate and reply frequencies in the range of a few hundred Hertz to a few thousand Hertz are appropriate. For coaxial cables, significantly higher reply and interrogate frequencies may be employed, depending upon the characteristics of the cable. The interrogate pulse repetition rate may have any value to an upper limit determined by bandwidth or transit time. This again points up another advantage to employing a dedicated coaxial cable for the transmission medium wherein significantly lower noise levels are present and significantly high pulse rates are made possible. It will be appreciated that faster interrogate pulse repetition rates result in the interrogation of a greater number of transducers per unit time, a feature which is particularly desirable in monitoring alarms which should be sampled often for effective protection.

A further feature of the arrangement of FIG. 1 is the fact that the same system is adaptable to monitoring diverse functions simultaneously; that is, not all of the transducers have to represent alarms, but rather some may represent alarms, some may represent meter readings, some may represent liquid level, etc.

It is within the scope of this invention to utilize more than one interrogate frequency. For example, multiple pluralities of oscillators may be located in transmitter 12 of FIG. 1, each generating an oscillatory interrogate signal having a different frequency. In this approach different transponders are tuned to different interrogate frequencies. Thus, if the central station generates interrogate frequencies $f_{i1}, f_{i2}, - f_{in}$, the transponders in channel I may have receivers tuned to interrogate frequency $f_{i1}$, likewise channel II would respond to $f_{i2}$, channel n would respond to $f_{in}$, etc. The main advantage of this approach is that it permits each interrogation frequency to be pulsed at a different rate, so that certain channels may be scanned (an entire channel interrogated) more rapidly than others. Thus, if certain measurements require more frequent updating than others, they can be ssociated with a transponder located in a channel scanned at a relatively fast rate (i.e. — higher pulse rate of the interrogation frequency for that channel).

In certain instances it may be desirable to arrange the various transponder channels in loops, as illustrated in FIG. 1a. In this approach the loop for each channel is scanned alternately from each end of the loop and reply signals are received at both ends of the loop. Such an arrangement prevents the loss of service for any transponder if one cable break occurs. If two cable breaks occur in the same loop, only those transponders located between the breaks experience service loss. More particularly, and specific reference is made to FIG. 1a, the central station includes a clock 11, transmitter-receiver 12, control logic circuit 13 and utilization equipment 14, 16, 17 of the type described with reference to FIG. 1. In addition, a gate circuit 15 is provided and is controlled by control logic circuit 13. Gate 15 includes first and second output terminals 15a and 15b respectively between which multiple loops of dedicated coaxial cable 19a, 19b, 19c are connected in parallel. Each loop represents the equivalent of a channel of transponders and each has plural transponders tapped therefrom at spaced locations. gate 15 is operative under control of circuit 13 to alternate trains of interrogate pulses between terminals 15a and 15b. Thus, alternate interrogation cycles are initiated at loops 19a, 19b and 19c from different ends of the loops. Reply pulses are received at both terminals of gate 15 and coupled to the receiver circuitry for processing at the central station.

Employing a dedicated coaxial cable with the present invention has additional advantages, particularly where the path between the central station and the most remote transponders is short enough as not to require repeater amplifiers or other active devices in the line. The absence of such active devices enhances system reliability considerably; failure of an active device at a terminal location affects only that location. The dedicated coaxial line approach, without active devices, permits virtually hundreds of frequency channels to operate on one path (the cable) and is equivalent in reliability and information carrying capacity to hundreds of individual hand-wired pairs.

Another aspect of the system of FIG. 1 permits its utilization with multiple receivers in each transponder, each receiver tuned to a different interrogate frequency. The central station is then able to transmit data to the transponder utilizing a carrier frequency other than the interrogate frequency. Thus, a pulse or pulsed interruption occurring in time-coincidence with a particular interrogate pulse might signal a transponder to act in a certain manner regarding the measurement called for by that interrogate pulse. For example, if an operator at the central station notices a monitored parameter approaching a limit at which some corrective action is required he may cause the central station to transmit a series of data pulses in time coincidence with corresponding interrogate pulses, the transmitted data pulses representing a binary number indicating the degree of correction required for the parameter. The transponder and transducer would, in such a system, be provided with automatic control means, operative in response to the received data pulses for effecting the necessary corrective action.

Figure 2:
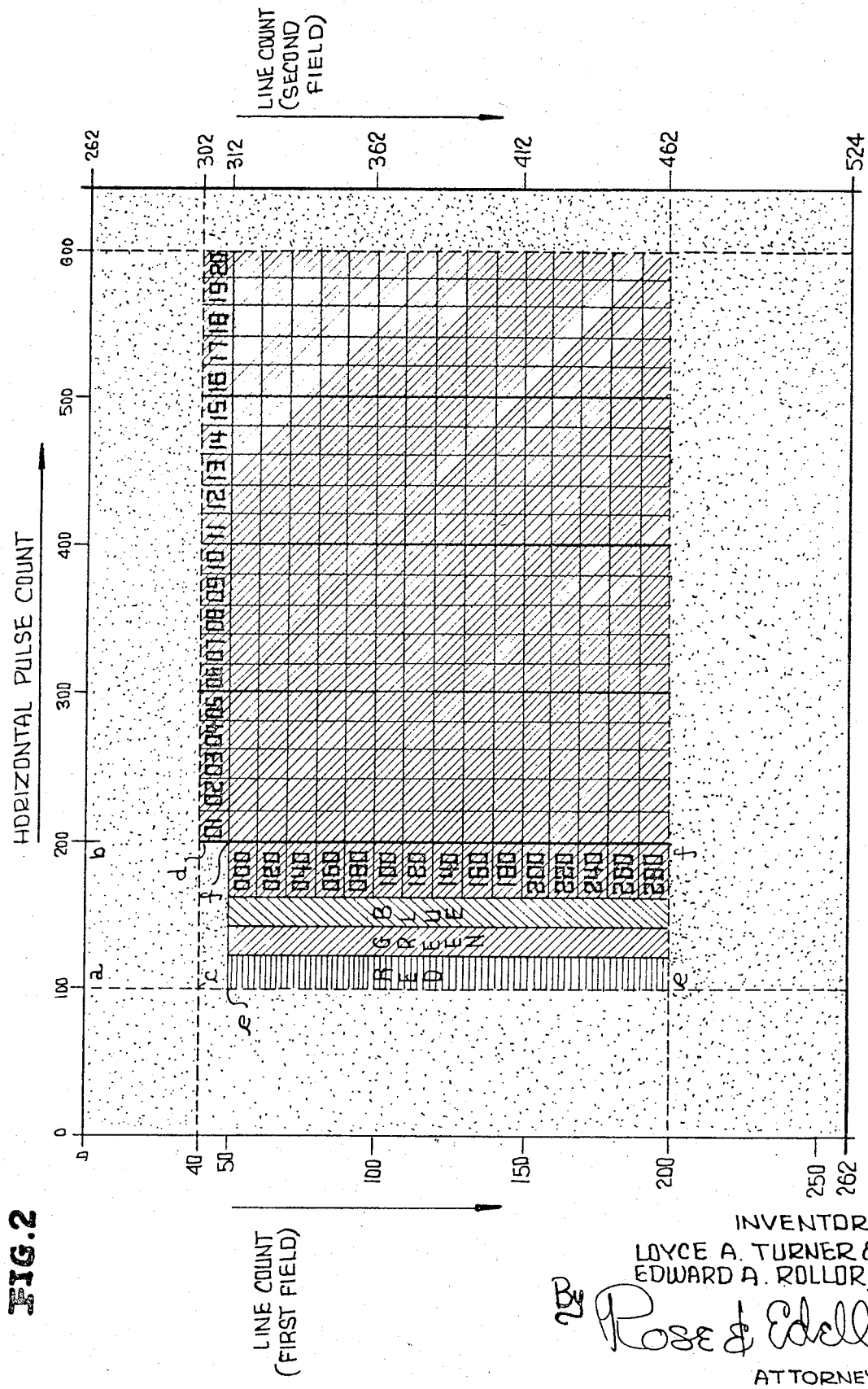
FIG. 2 is a diagrammatic illustration of a television display screen according to the present invention.

Referring now to FIG. 2 there is illustrated a television display suitable for use as display element 14 in FIG. 2. For purposes of the present discussion, the display is described as indicating the states of three hundred transducers and the transducers are assumed to represent alarms. It is to be understood however that the principles described are applicable to substantially any number of transducers and that the transducers may represent a variety of monitored parameters. In addition, certain numerical values for frequencies, repetition rates, and other parameters, are assumed in the following discussion for illustration only and are not to be construed as limiting the scope of the invention. In addition, for ease in description only a single channel of transponders and a single pair of reply frequencies is described; however, it is to be appreciated that multiple channels, distinguished by their reply frequencies as described in relation to FIG. 1, may be employed.

The 300 point display is a color CRT (cathode ray tube) which exhibits an illuminated pattern of 300 rectangles (approximating squares) in an array of 20 columns and 15 rows. Each square corresponds to a monitored function at a remote location which has either a "normal" (for instance, closed contacts) or "alarm" (for instance, open contacts) transducer status. The square assigned to that function is green if the status is normal, red for alarm and blue if its transponder fails to send back either a normal or alarm signal. A green row appears just above the grid pattern and contains black two-digit numbers which label the columns. A green column having twice the width of a column of grid squares appears just to the left of the grid pattern and contains three digit numbers which label the rows. To the left of this green column is a blue column of normal column width. Another column to the left is a normal-width green column, and on its left is a normal-width red column. The red and blue columns provide evidence that the red and blue color guns of the CRT are functioning under no-alarm conditions. The transducer identification number associated with each grid square is the sum of the row number and the column number in which it is located. The numbers appearing along the top and sides of the display are described in detail subsequently.

Referring now to FIG. 3, there is illustrated a detailed functional block diagram of a system such as that of FIG. 1 which employs the display of FIG. 2. Major functional blocks are grouped inside blocks bordered by solid lines, the circuitry in each of these blocks being illustrated in greater detail in subsequent figures. Inside the major blocks are illustrated smaller blocks bordered by dashed lines, which represent individual circuits.

Clock circuitry 20 includes a master oscillator 31 and two sets of scalers which count pulses from the oscillator in order to determine the position of the CRT beam. A first set of scalers, A, B and C counts master oscillator pulses and re-cycles once during each horizontal trace on the CRT. The D, E, F scaler set counts horizontal sweeps to determine the vertical position of the beam. Decimal output signals are available from the A scaler, and BCD (binary coded decimal) output signals are available from scalers B, C, D, E and F. BCD-to-decimal converters B, C, D, E and F convert the BCD signals from corresponding scalers to decimal output signals. These various output signals are fed to other parts of the system to provide gate signals which relate the CRT beam position to certain coordinates.

The reset and trigger circuits 21 generate a pulse which resets the ABC scaler set after each 640 master oscillator pulses and triggers horizontal retrace of the CRT beam on a pulse count of 600. The horizontal trigger signal is the input count pulse to the DEF scaler set which thereby keeps track of horizontal sweeps. Reset and trigger circuits 21 also generate a pulse which resets the DEF scaler set after each 525 horizontal traces. Circuits 21 also trigger vertical retrace of the CRT beam after each 262 ½ horizontal traces to provide a 525 line frame of two interlaced fields. The nature of the interlaced fields is described in detail subsequently.

The video information circuitry 22 provides information to gate the proper color gun (or none) according to the CRT beam position. It generates blanking signals at proper times to shut off all color guns, thereby "printing" the vertical and horizontal dark lines in FIG. 2 which separate the image into columns and rows of grid squares. Circuitry 22 accepts timed signals from the character information circuitry 23 and responds by "printing" dark numerals which label the rows and columns. It also blanks out the beam in the region outside the area covered by the image and illuminates each grid square with the proper color gun in accordance with instructions from the memory 16.

The transmitter/receiver 12 sends out an interrogate pulse train of 2,400 pulses by interrupting a 3.15 KHz carrier at a 60 Hz rate. At the end of each train of 2,400, the carrier is held on continuously for a period corresponding to the duration of another 160 pulses, providing an interrogate cycle of (2,560/60), or 42 ⅔ seconds. The transponders IA—Im receive the pulsed carrier and count the interrogate pulses in the train. Transponder logic circuitry determines when the transponder should transmit a reply pulse and which reply frequency (2.1 KHz or 1.31 KHz) it is to transmit. Transmitter-receiver 12 receives the reply frequency and instructs the receiver-memory interface 24 as to which frequency (or frequencies, or neither) was received.

Interface 24 writes the reply information from the receiver for one interrogate pulse into the memory 16 during each vertical retrace. It also addresses the entire memory during each vertical scan, and transfers the stored information to the color generator in video information circuit 22 to produce the colored grid pattern representing the conditions of the various alarms.

Referring now to FIG. 4, master oscillator 31 is a conventional crystal-controlled oscillator operating at a frequency of 10.08 MHz. The master oscillator output signal is in the form of shaped pulses which are applied directly to scaler A, and particularly to the clock terminal of each of four clocked flip-flops FF(A), FF(B), FF(C) and FF(D), each comprising a J—K negative-edge-triggered flip-flop, such as Texas Instruments model SN74H103. For purposes of the description set forth hereinbelow, and unless otherwise specified, a binary convention is assumed wherein a binary "1" signal is more positive than a binary "0" signal. Actually, as illustrated in FIG. 4, the master oscillator signal is applied to two input terminals of two-input NAND gate 32 which provides a positive clock pulse for the scaler A flip-flops during each negative half cycle of the master oscillator signal. The flip-flops in turn trigger on the negative-going trailing edge of the clock pulses.

A scaler A unit also includes an excess 3 gray-to-decimal decoder 33, for example of the same type as Texas Instruments Model SN7444N. The Q output signals from the four flip-flops FF(A), FF(B), FF(C) and FF(D) are applied as input signals to decoder 33 which decodes these signals and provides a decimal output in the form of 10 signals $0, \bar{1}, \bar{2}, \bar{3}, — \bar{9}$. Only one of these signals at a time is binary "0," depending upon the states of the excess 3 gray coded input signals applied to converter 33. The decimal signals from converter 33 are applied to various J and K input terminals of the flip-flops, via appropriate ones of NAND gates 34, 35, 36, inverters 37, 38, 39, 40, 41 and NAND gate 42, as illustrated, to effect excess 3 gray code counting by the flip-flops of the master oscillator pulses. Since this mode of counting is well known it is not described in detail herein. For ease in reference, however, the following Table I is provided to indicate the binary states of the various signals immediately following the indicated count pulse number.

TABLE I

| Count No. | Q(A) | Q(B) | Q(C) | Q(D) | $\bar{0}$ | $\bar{1}$ | $\bar{2}$ | $\bar{3}$ | $\bar{4}$ | $\bar{5}$ | $\bar{6}$ | $\bar{7}$ | $\bar{8}$ | $\bar{9}$ |
|---|---|---|---|---|---|---|---|---|---|---|---|---|---|---|
| 0 | 0 | 0 | 0 | 0 | 0 | 1 | 1 | 1 | 1 | 1 | 1 | 1 | 1 | 1 |
| 1 | 0 | 0 | 1 | 0 | 1 | 0 | 1 | 1 | 1 | 1 | 1 | 1 | 1 | 1 |
| 2 | 1 | 0 | 1 | 0 | 1 | 1 | 0 | 1 | 1 | 1 | 1 | 1 | 1 | 1 |
| 3 | 1 | 1 | 1 | 0 | 1 | 1 | 1 | 0 | 1 | 1 | 1 | 1 | 1 | 1 |
| 4 | 0 | 1 | 1 | 0 | 1 | 1 | 1 | 1 | 0 | 1 | 1 | 1 | 1 | 1 |
| 5 | 0 | 1 | 1 | 1 | 1 | 1 | 1 | 1 | 1 | 0 | 1 | 1 | 1 | 1 |
| 6 | 1 | 1 | 1 | 1 | 1 | 1 | 1 | 1 | 1 | 1 | 0 | 1 | 1 | 1 |
| 7 | 1 | 0 | 1 | 1 | 1 | 1 | 1 | 1 | 1 | 1 | 1 | 0 | 1 | 1 |
| 8 | 0 | 0 | 1 | 1 | 1 | 1 | 1 | 1 | 1 | 1 | 1 | 1 | 0 | 1 |
| 9 | 0 | 0 | 0 | 1 | 1 | 1 | 1 | 1 | 1 | 1 | 1 | 1 | 1 | 0 |

The excess 3 gray code, in which only one bit changes state per count, is employed to count the high frequency master oscillator in order to prevent erroneous counts which might otherwise be caused if more than one flip-flop per count were permitted to change states; this is a particularly important consideration at high counting rates. The decimal output signals from converter 33 are inverted to provide the decimal "A" output signals from the A scaler unit. These output signals are referred to hereinbelow as A0, A1, A2, — A9, with only one signal at a time being in the binary "1" state.

The B, C, D, E and F scalers are straight binary coded decimal counters, such as Texas Instruments Model SN7490, and each feeds a respective BCD-to-decimal converter 46, such as Texas Instruments Model SN7442. The binary coded decimal output signals from scalers B through F comprise four binary signals designated by the scaler letter with a subscript. For example, scaler B provides four signals designated $B_A$, $B_B$, $B_C$, and $B_D$; scaler C provides $C_A$, $C_B$, $C_C$, and $C_D$; etc. These signals are utilized to perform various timing functions in the system.

The output signal from each of decoders 46 is in decimal form, comprising 10 binary signals $\bar{0}$, $\bar{1}$, — $\bar{9}$, of which only one at a time is binary "0." Only five of these ($\bar{1}$ through $\bar{5}$) are used directly for timing purposes in the system; all, however, are inverted to provide 10 binary signals, 0, 1, — 9 of which only one at a time is binary "1." These 15 timing signals, when employed elsewhere in the system, are designated by a letter, indicating their originating scaler, followed by the signal number. Thus, when the count in scaler B is four, signal B4 is binary "1" and signal $\overline{B4}$ is binary "0;" when the count in scaler C is eight, signal C8 is binary "1" and each of $\overline{C1}$ through $\overline{C8}$ is binary "0;" etc.

Scalers A, B and C, with signal A9 employed as a count pulse for scaler B and signal $B_D$ employed as a count pulse for scaler C, provide a 640 count cycle for each horizontal trace of the CRT beam, thereby defining 640 discrete beam positions during each horizontal trace. The decimal output signals from converters 46 are capable of uniquely representing each horizontal position with a decimal number wherein the A number is the units decade, the B number is the 10s decade, and the C number is the hundreds decade. Thus when A0, B0 and C0 are binary "1," the beam is at the left edge of the display as viewed in FIG. 2. When C6, B3 and A9 are binary "1," the beam is at the right side of the display. Scalers A, B and C are each reset by the HORIZONTAL RESET signal, generated as described below in relation to FIG. 5b.

Figure 5A:
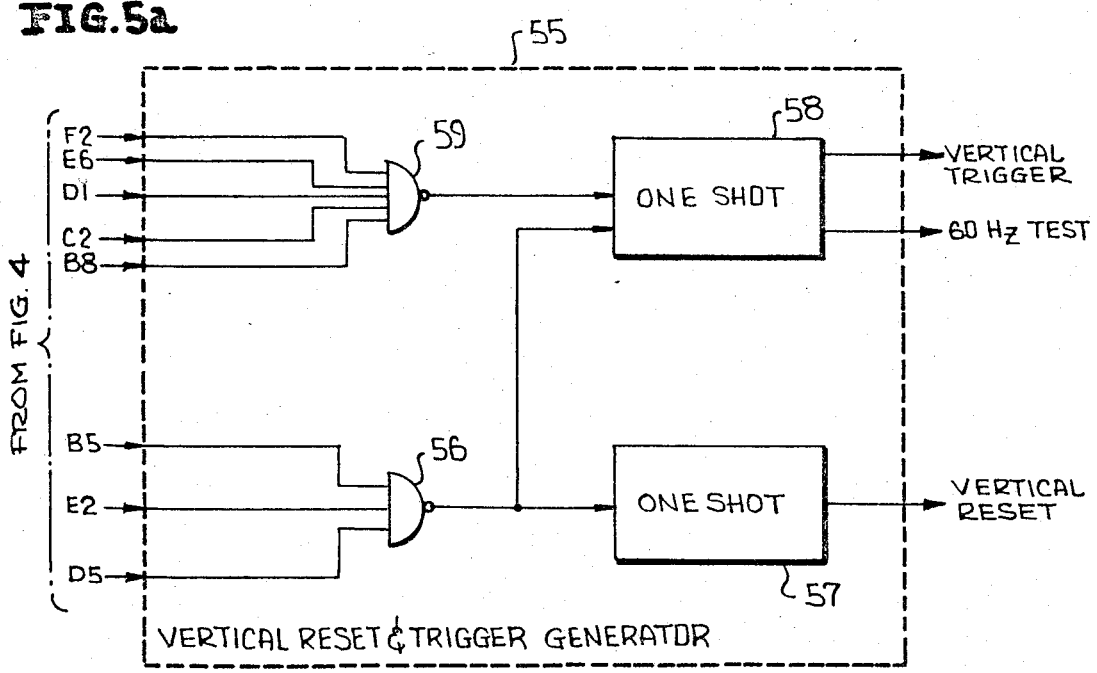
Figure 5B:
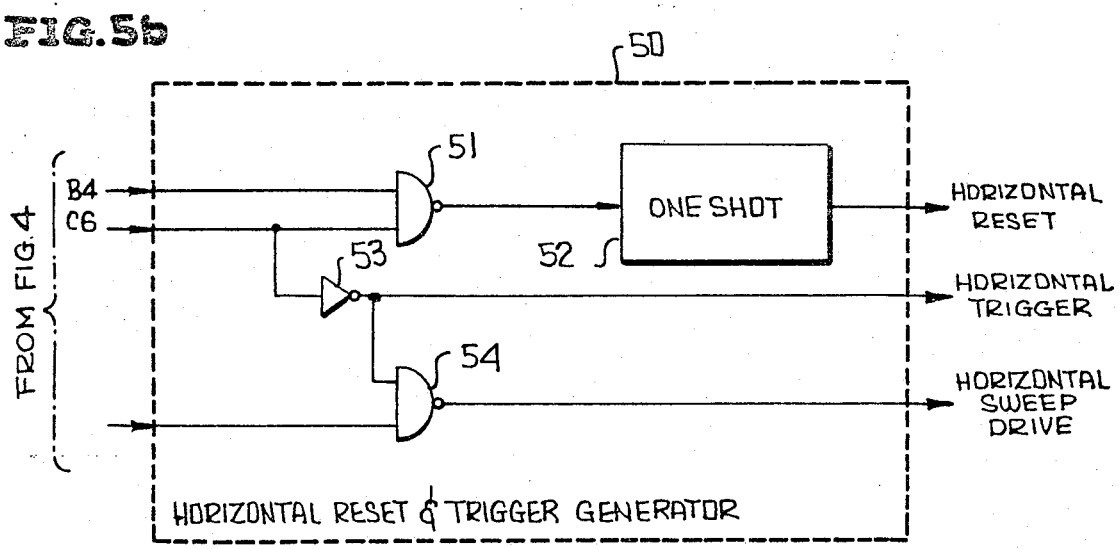

A HORIZONTAL TRIGGER pulse, generated once during each horizontal sweep in the manner described below in relation to FIG. 5b, is employed as the input count pulse to scaler D. Signal $D_D$ is employed as a count pulse for scaler E, and signal $E_D$ is employed as a count pulse for scaler F. In this manner scalers D, E and F are arranged to count horizontal sweeps, registering a three digit decimal number wherein scaler D represents the units decade, E represents the tens decade, and F represents the hundreds decade. A 525 count cycle is employed, each count identifying a particular horizontal sweep and thereby locating the vertical position of the beam. For example, when D0, E0 and F0 are binary "1," the first horizontal sweep is in progress and the beam is sweeping across the top of the viewing screen. The horizontal position of the beam during the sweep is ascertained as described above from scalers A, B and C.

The relative timing may be best appreciated from the fact that each count period in scaler A lasts approximately $(1/10.08 \times 10^6)$ seconds, or about 0.1 microsecond. A 640 count sweep, therefore, lasts about 64 microseconds. A standard scan rate of 30 frames per second with 525 sweeps per frame (or 15,750 lines per second) is employed.

Referring now to the horizontal reset and trigger generator 50 in FIG. 5b, the A, B and C scalers of FIG. 4 reset after each complete horizontal sweep of approximately 64 μsec. When the count is 639, the next pulse into scaler "A" from oscillator 31 results in a "1" on B4. Since C6 is also a "1" at this time, NAND gate 51 applies a "0" pulse to a one shot 52 which delivers a horizontal reset signal to scalers B and C. The next count is therefore 000 instead of 640, providing a horizontal sweep consisting of 640 counts, namely counts 0 through 639. The CRT horizontal retrace, however, is triggered at count 600 by a "Horizontal Trigger" signal pulse produced by feeding C6 through inverter 53. This same pulse is the input to scaler D in FIG. 4 so that scalers D, E and F count horizontal sweeps, or lines, beginning on the 600-th count in the preceding sweep.

When the F, E, D count is 524 and the C, B, A count reaches 600, the F, E, D count goes to 525, and "1" inputs F5, E2 and D5 to NAND gate 56 in the vertical reset and trigger circuit 55 (FIG. 5a) cause a negative pulse, which fires both one shots 57 and 58 and produces a vertical reset pulse and a vertical trigger pulse. The F, E, D scalers in FIG. 4 are reset to 000 by the vertical reset pulse and remain in that state until the 600-th count in the succeeding horizontal sweep. One shot 58 also generates a vertical trigger pulse when the F, E, D count is 261, and the C, B, A count is 280. This is achieved by feeding F2, E6, D1, C2 and B8 into NAND gate 59 which feeds one shot 58. The latter is delivered to the CRT (FIG. 3) and initiates the vertical retrace for the second field at horizontal pulse number 280 after line no. 261, or exactly 262 ½ lines after the start of the retrace for the first field at 524-600.

Figure 6:
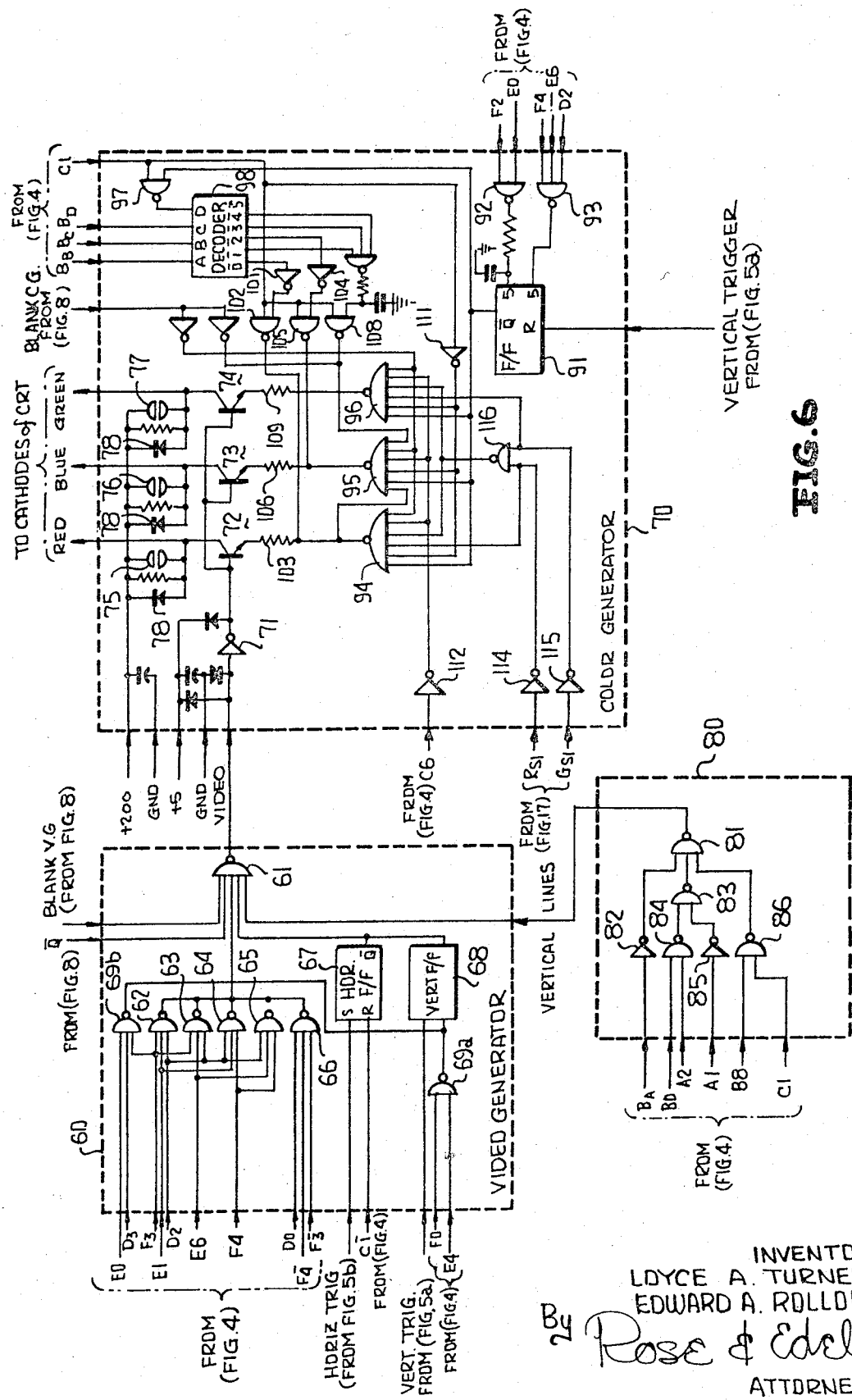

Referring now to FIG. 6, and particularly to video generator circuit 60, a "1" is provided by 5-input NAND gate 61 whenever any of its input signals is "0." This NAND output signal is inverted to "0" in color generator 70 by inverter 71 and fed to the base of each of three n-p-n transistors 72, 73, 74. The "0" signal cuts off the transistors to blank out the video signal at the CRT cathodes. Blank VG, the first of the five input signals to gate 61, comes from the character horizontal size circuit 120 in FIG. 8 and blanks out the CRT beam in the area marked *abdc* of FIG. 2, as will be subsequently explained. The signal, from the character generator 150 in FIG. 8, blanks out the beam at the proper X, Y coordinates to form the black digits on a green background which are employed to label the rows and columns on the screen in FIG. 2. The third input signal to gate 61 is the common output of five NAND gates 62, 63, 64, 65 and 66, and is, therefore, negative only when all of the inputs of at least one of these five gates are positive, since DTL logic circuitry is employed. More specifically, NAND gates 62 through 66 have their output terminals tied together in a conventional wired-Or configuration. The input signals to NAND gate 62 are F3, E1, D2; to NAND gate 63 are F3, E6, D2; to NAND gate 64 are F4, E1, D2; and to NAND gate 65 are F4, E6, D2. These gates serve to blank out horizontal traces numbered 312, 362, 412 and 462 respectively. Note that these horizontal lines are the second-field lines just above lines numbered 50, 100, 150, and 200 in the first field (FIG. 2). The input signals to NAND gate 66 are F3, F4 and D0. Therefore, gate 66 produces a negative output on all horizontal lines with numbers ending in zero except those in the range 300 through 499, which are within the boundaries of the image and in the second field. This effectively prints narrow horizontal black lines which divide the image into horizontal rows. The output signals from NAND gates 62 through 65 print a line just above the first field lines numbered 50, 100, 150 and 200, producing the effect of an extra wide black line at these locations.

The fourth input to NAND gate 61 is from the Q output terminal of each of two flip-flops 67, 68. Flip-flop 67 labeled "HOR F/F" assumes its set state (with "0" on the $\overline{Q}$ terminal) when a "0" pulse is received at its S input, and remains in that state until a "0" signal is received on its R input to switch the $\overline{Q}$ terminal back to the "1" state. The S input receives the horizontal trigger pulses from inverter 53 (FIG. 5b), and the R input receives signal $\overline{C1}$. Therefore, the horizontal trigger pulse produces a "0" input signal at NAND gate 61 on a horizontal count of 600 and remains in effect until count 100 in the next trace. This restricts the width of the image to that illustrated in FIG. 2.

Flip-flop 68, labeled "VERT F/F" receives a "0" signal on its S input at each vertical trigger pulse and a "0" signal at its R input whenever the output of either of NAND gates 69a or 69b is "0." NAND gate 69a has as inputs F0 and E4 and therefore produces a "0" pulse to trigger flip-flop 68 to "reset" when the count in the FED scaler set goes from 039 to 040. NAND gate 69b has as inputs F3, E0 and D3 and therefore triggers flip-flop 68 to "reset" at a line count of 303. This has the effect of blanking out the image for line numbers zero through 40 in the first field and the lines just below these in the second field, i.e. line numbers 262 through 303. The blanked out area is the portion above the dotted line in FIG. 2 across the top of the green row containing the column number labels.

The last input to NAND gate 61 is the output of 3-input NAND gate 81 in vertical lines control circuit 80. This circuit provides the information necessary to print the vertical lines that divide the image into columns of grid squares. The first input signal to gate 81 is the inversion (via inverter 82) of the $B_A$ signal from the first stage of scaler B (FIG. 4). $B_A$ becomes "1" on each horizontal count ending in 10, 30, 50, 70 and 90, and "0" on each count ending in 20, 40, 60, 80 and 100. The inverted form of $B_A$ applies a "1" to the 3-input NAND gate on counts ending in 00 through 09, 20 through 29, 40 through 49 and 60 through 69 and 80 through 89. The second input to NAND gate 81 is the output of 2-input NAND gate 83 and is "1" only when either of its inputs is "0." One of these inputs is the output of NAND gate 84 having inputs B0 and A2. Gate 84, therefore, is "0" only on CBA scaler counts ending in 02. The other input to gate 84 is A1, inverted by inverter 85. Therefore, the second input to NAND gate 81 is "1" on each count ending in 02 and on each count ending in 1. The third input to NAND gate 81 is the output of NAND gate 86 which has as inputs C1 and B8 and is, therefore, "1" at all times except when the CBA scaler count is 180 through 189. This prevents the printing of a vertical line on a count of 182, which would fall in the region occupied by the digits which compose the row number labels (FIG. 2). However, on all other counts ending in 02, 01, 21, 41, 61 and 81, all three signals into NAND gates 81 are "1," and a "0" signal is delivered to video generator 60 to instruct color generator 70 to "print" a vertical line. This results in a series of vertical dark lines separating the color bars, row number lables and individual columns of grid squares, with an extra wide line between the row number labels and the grid pattern, and between each group of five columns of grid squares (FIG. 2).

The video signal to color generator 70 from NAND gate 61 is normally "0." Whenever one of the inputs to NAND gate 61 is "0," however, the video signal is "1", and the inverted signal grounds the bases of all three transistors 72, 73, 74. With the transistors thusly cut off, the cathodes of the red, blue and green color guns of the CRT are raised to +200 volts, thus preventing emission. The neon tube 75, 76, 77 connected to each collector is for lightning protection and the parallel diodes 78 keep the collector voltage from becoming very high due to the CRT cathode current.

Flip-flop 91 has two S inputs, one from NAND gate 92 having as inputs F2 and E0, the other from NAND gate 93 having as inputs F4, E6 and D2. The R input for F/F 91 is the vertical trigger pulse. Therefore, the flip-flop is in its set state (Q is "1", $\overline{Q}$ is "0") during line counts 200 through 262 ½ and 462 through 524; it is in the "reset" state (Q is "0," $\overline{Q}$ is "1") for line counts 0 through 199 and 262 ½ through 461. The Q output from F/F 91 is an input to each of three 6-input NAND gates 94, 95, 96. It provides a "0" signal during lines 200 through 262 ½, and during 462 through 524, causing a positive voltage at the outputs of all three NAND gates 94, 95, 96. This places the emitters of the three transistors 72, 73, 74 at positive voltage, cutting off the three transistors and blanking out the portion of the CRT screen below the grid pattern image (FIG. 2).

The $\overline{Q}$ output of flip-flop 91 is also one input of NAND gate 97 which has C1 as its other input. Gate 97 feeds the D input of a BCD-to-decimal converter 98 which, for example, may be Texas Instruments Model SN7442. Only one output of the converter is negative (or "0") for any combination of inputs, as follows:

TABLE II

| INPUTS | | | | "0" OUTPUT TERMINAL |
|---|---|---|---|---|
| A | B | C | D | |
| 0 | 0 | 0 | 0 | $\bar{0}$ |
| 1 | 0 | 0 | 0 | $\bar{1}$ |
| 0 | 1 | 0 | 0 | $\bar{2}$ |
| 1 | 1 | 0 | 0 | $\bar{3}$ |
| 0 | 0 | 1 | 0 | $\bar{4}$ |
| 1 | 0 | 1 | 0 | $\bar{5}$ |
| 0 | 1 | 1 | 0 | $\bar{6}$ |
| 1 | 1 | 1 | 0 | $\bar{7}$ |
| 0 | 0 | 0 | 1 | $\bar{8}$ |
| 1 | 0 | 0 | 1 | $\bar{9}$ |

Only the $\bar{0}, \bar{1}, \bar{2}, \bar{3}$ and $\bar{4}$ outputs are used. The D input is in the "0" state, selecting one of these outputs as the only "0" output, when the C1 and $\bar{Q}$ inputs to NAND gate 97 are both "1". These conditions prevail only when the CRT beam position corresponds to a pulse count in the horizontal trace of 100 through 199 and a line count of 0 through 199 in the first field and 261 ½ through 462 in the second field. This corresponds to the rectangular area *abfe* in FIG. 2 containing the red, green and blue vertical bars and the row number labels. The area *abdc* is blanked out to be described subsequently, leaving the area *cdfe* as the only illuminated portion of the screen to the left of horizontal pulse count 200.

Figure 7:
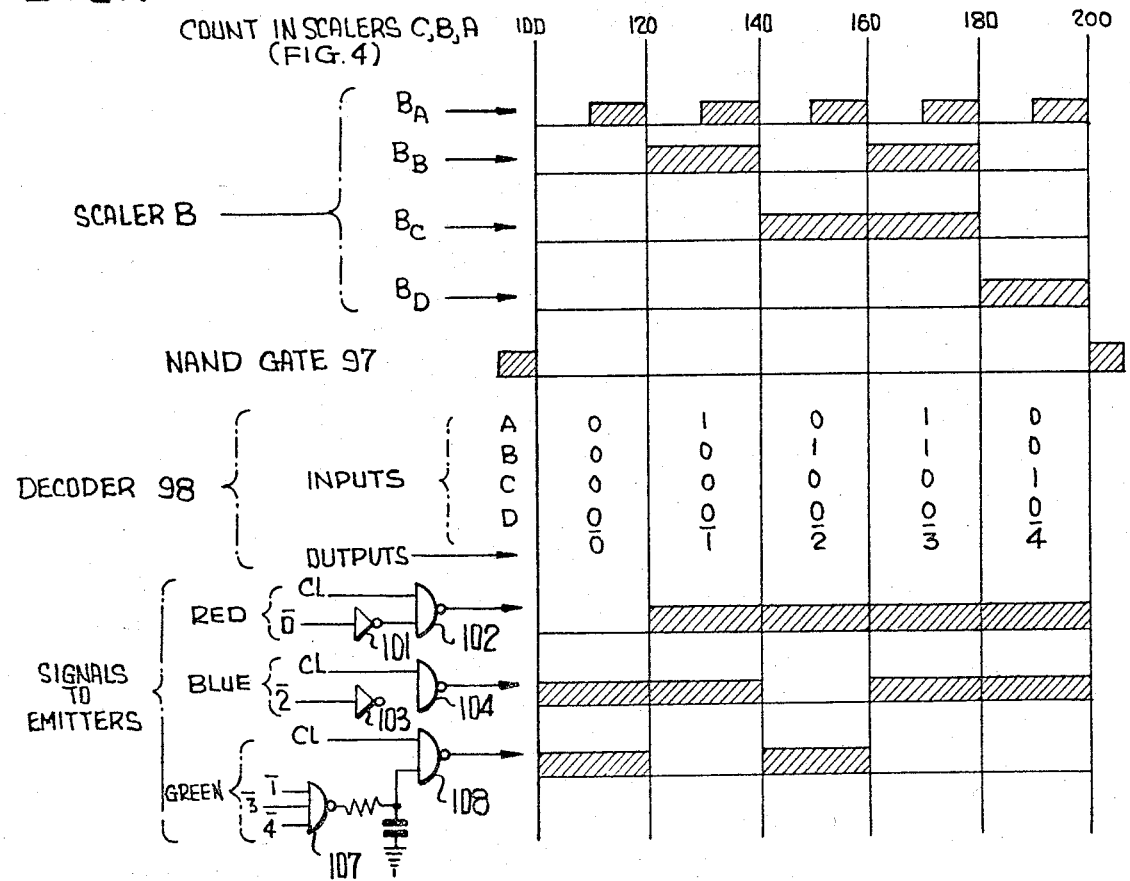
FIGS. 7, 12, 13 and 13a are timing diagrams for various signals provided in the system of FIG. 3.

FIG. 7 illustrates how the inputs to decoder 98 change during horizontal pulse counts between 100 through 199 in the CBA scaler system. $B_A$, the output of the first binary stage of scaler B, is "0" until the end of the ninth count in scaler A. When scaler A resets to "0", $B_A$ goes to "1" until scaler A resets again. Therefore, $B_A$ is "0" for scaler B counts 0 through 9, "1" from 10 through 19, "0" again from 20 through 29, etc., as shown in FIG. 7. $B_B$ counts negative pulses from $B_A$, i.e., it changes state each time $B_A$ goes from "1" to "0". $B_C$ changes state on the trailing edge of $B_B$, and $B_D$ changes on the trailing edge of $B_C$. The A, B, C, D inputs to decoder 98 are $B_B$, $B_C$, $B_D$ and the output of NAND gate 97. The decoder output is $\bar{0}$ during counts 100 through 119, $\bar{1}$ during 120 through 139, $\bar{2}$ during 140 through 159, $\bar{3}$ during 160 through 179, and $\bar{4}$ during 180 through 199, as shown in FIG. 7.

The $\bar{0}$ output is inverted by inverter 101 (FIG. 6) and along with C1, is fed to NAND gate 102 whose output connects through a resistor to the emitter of transistor 72 which gates the cathode of the red color gun. Therefore, NAND gate 102 has a "0" output (FIG. 7) only when the CBA scaler count is 100 through 119 and produces the vertical red bar (FIG. 2) to indicate that the red color gun is working. The $\bar{2}$ output is inverted by inverter 104 and, along with C1, is fed to NAND gate 105 (FIG. 6) whose output connects through resistor 106 to the emitter of transistor 73 which gates the blue color gun. The output of NAND gate 105 is "0" (FIG. 7) only when the CBA scaler count is 140 through 169 and produces the vertical blue bar (FIG. 2) to indicate that the blue color gun is working. The $\bar{1}, \bar{3}$ and $\bar{4}$ outputs of decoder 98 (FIG. 6) are inputs to NAND gate 107, the output of which is one input to NAND gate 108 whose other input is C1 and whose output is connected through resistor 109 to the emitter of transistor 74 which gates the green color gun. This grounds resistor 109 for counts 120 through 139 and again for counts 160 through 199, causing transistor 74 to conduct, thus producing the vertical green bar between the red and blue, and another which forms the background for the row number labels.

Each of the three NAND gates 94, 95, 96 normally has at least one "0" input, so that its output is positive, and its associated transistor is cut-off. When all inputs to one of these NAND gates are "1", the output from that gate is at ground and the associated transistor conducts, firing the associated color gun. One input to all three gates is C1 inverted by inverter 111. Therefore, the horizontal count must be outside the range 100 through 199 for gates 94, 95 or 96 to ground resistor 103, 106 or 109, respectively, and cause interference with the function of decoder 98. Another input to all three gates 94, 95, 96 is C6, inverted by inverter 112. This restricts the count to less than 600 for any gun to fire and produces a dark screen to the right of the grid square image. A third input to gates 94, 95, 96 is the $\bar{Q}$ output of flip-flop 91. As explained earlier, this output is positive only for horizontal sweeps 0 through 199 in the first field and 261 ½ through 461 in the second. It therefore blanks out the beam on the portion of the screen below the last row of grid squares. A fourth input to gates 94, 95, 96 is the blank CG signal (FIG. 8), which is inverted by inverter 113. It is "1" only during lines 50 through 261 ½ in the first field and 312 through 524 in the second. It therefore blanks out the beam above the first row of unlabeled squares. The fifth input to NAND gate 94 is the inversion of the $R_{S1}$ signal from FIG. 17, the inversion being effected by inverter 114. It provides a "1" signal when the information in the memory position corresponding to the alarm station number represented by the CRT beam coordinates indicates "alarm" status. The fifth input to NAND gate 96 is the inversion of the $G_{S1}$ signal from FIG. 17, the inversion being effected by inverter 115. It provides a positive signal whenever the information in the memory position corresponding to the alarm station number represented by the CRT beam coordinates indicates "normal" status. The sixth input to NAND gates 94 and 96 is the output of NAND gate 116 whose inputs are the two inverted $R_{S1}$ and $G_{S1}$ signals. Therefore, "0" signals on both the $R_{S1}$ and $G_{S1}$ inputs ("1" after invertion) cause the sixth input to both NAND gates 94, 96 to be "0" and prevent firing of either the RED or GREEN color gun. The fifth and sixth inputs to NAND gate 95 are the outputs of NAND gates 94 and 96. A "0" signal on both inputs from $R_{S1}$ and $G_{S1}$ produces positive outputs on both NAND gates 94, 96; this is the only condition in which all six inputs to NAND gate 95 are positive, and only then can the BLUE gun fire.

The blank C G signal is applied through another inverter 117 to the output of NAND gate 96. This produces a green background for the column number labels by grounding resistor 109 on the emitter of transistor 74 for line counts 0 through 49 and 261 ½ through 311. However, the signal from video generator 60 applied to the base of transistor 74 blanks out all of this green area above lines 40 in the first field and 303 in the second, as explained earlier.

Figure 8:
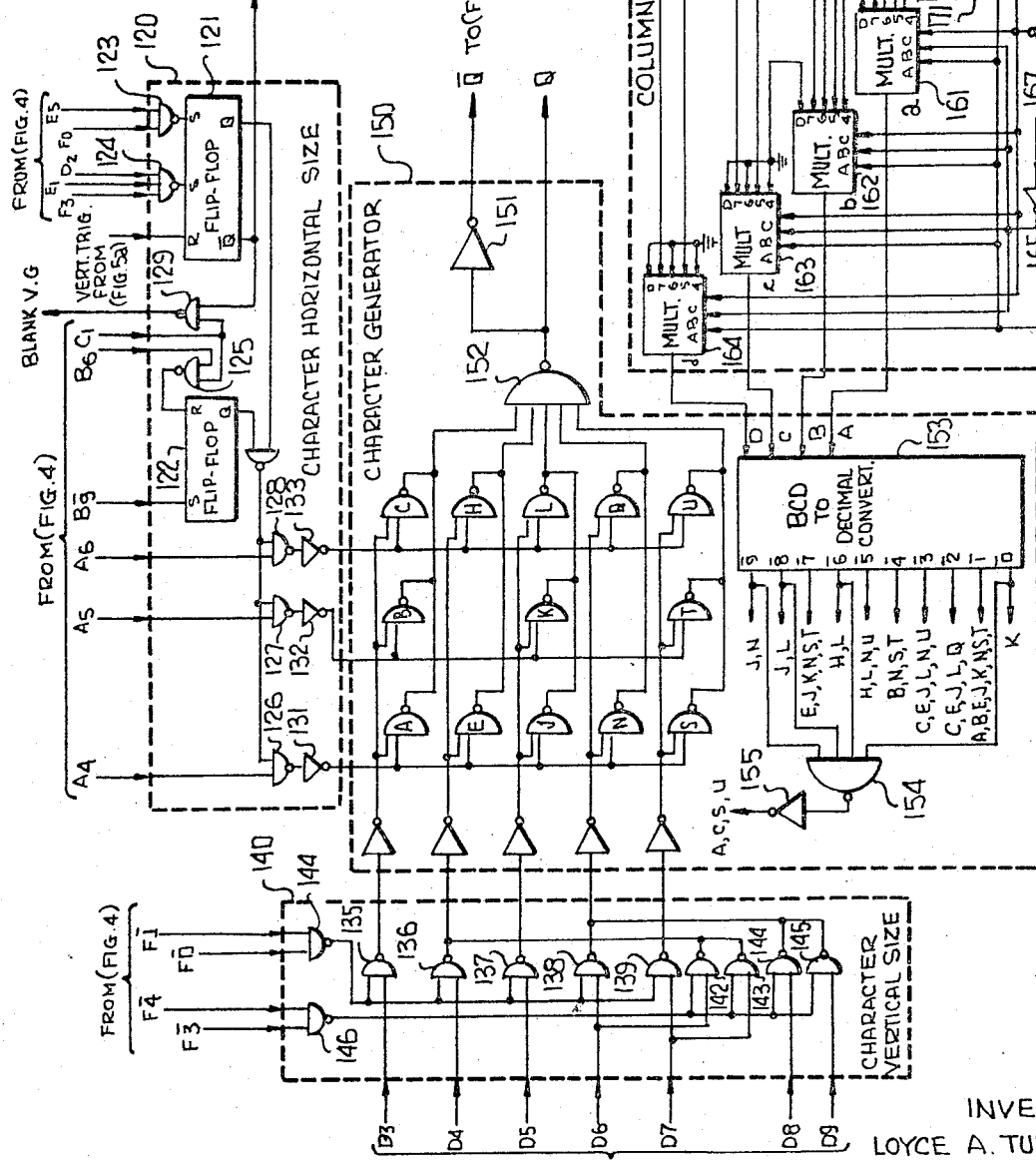
Figure 11A:
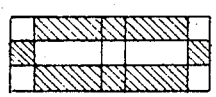
FIG. 10 and 11 (a through j) are diagrammatic illustrations of detailed portions of the display of FIG. 2.
Figure 11B:
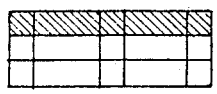
Figure 11C:
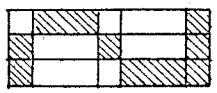
Figure 11D:
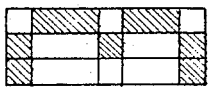
Figure 11E:
Figure 11F:
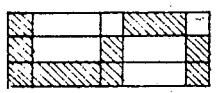
Figure 11G:
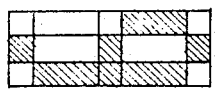
Figure 11H:
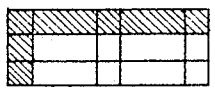
Figure 11I:
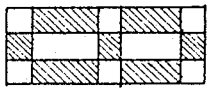
Figure 11J:
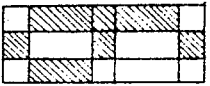

Referring now to FIG. 8, and particularly to the character horizontal size circuit 110, there are illustrated two flip-flops 121, 122 which, for example, may be of the Motorola MC 463 type. The vertical trigger pulse from circuit 55 (FIG. 5a) resets flip-flop 121 until the beginning of horizontal sweep number 50. At that time, the "1" inputs F0 and E5 to NAND gate 123 provide a negative pulse to an S input of flip-flop 121 to switch it to the set state. The vertical trigger on the 280-th pulse of the 261-st line resets flip-flop 121 again. NAND gate 124, with inputs F3, E1 and D2, sets flip-flop 121 during line 312. The Q output of flip-flop 122 goes to "0" state on clock pulse 160, when C1 and B6 cause NAND gate 125 to feed a "0" pulse to its R input. One pulse 190, B9 provides a "0" pulse to the S input of flip-flop 122 and drives the flip-flop to its set state.

Figure 9:
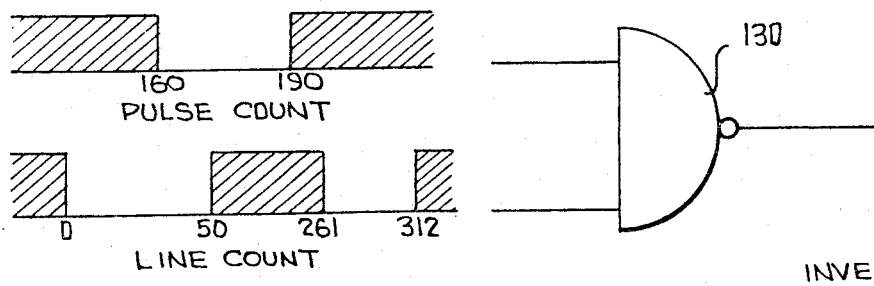

The Q outputs of the two flip-flops 121, 122 are inputs to NAND gate 130 whose operation is illustrated in detail in FIG. 9. The output of NAND gate 130 is "1" whenever the pulse count is 160 through 189, or When the line count is 0 through 49 or 261 ½ through 311. This output is one input to each of three NAND gates 126, 127, 128 (FIG. 8) whose other inputs are A4, A5 and A6 respectively. The outputs of these NAND gates are "0" only during count pulses 164, 165, 166, 174, 175, 176, 184, 185 and 186 in every horizontal line. These pulses, in aggregate, define respective vertical lines which contain all the elements that make the three-digit numbers which label the rows of grid squares (FIG. 2). The outputs are "0" also for all CRT bam positions for which the pulse count ends in 4, 5 or 6 and the line count is less than 50 in the first field or less than 312 in the second field. These, in aggregate, correspond to respective vertical lines which contain all the elements of the digits that label the columns of grid squares. The outputs of NAND gates 126, 127, 128 are inverted by inverters 131, 132 and 133, respectively, before being applied to character generator circuit 150 as described below.

The input C1 also goes to NAND gate 129 whose other input is the Q̄ output of flip-flop 121. The "0" state of NAND gate 129 occurs when the pulse count is 100 through 199 and the line count is 0 through 49 or 261 ½ through 312. This output designated blank V.G., is fed to video generator 60 (FIG. 6) to blank out the video signal in the rectangular area abdc in FIG. 2. The Q̄ output of flip-flop 121, which is designated blank C, G and which is "1" during a line count of 0 through 50 and 261 ½ through 312, is fed to color generator 70 (FIG. 6) to blank out the video signal on the portion of the screen above line 50 (except for the column label background).

Figure 10:
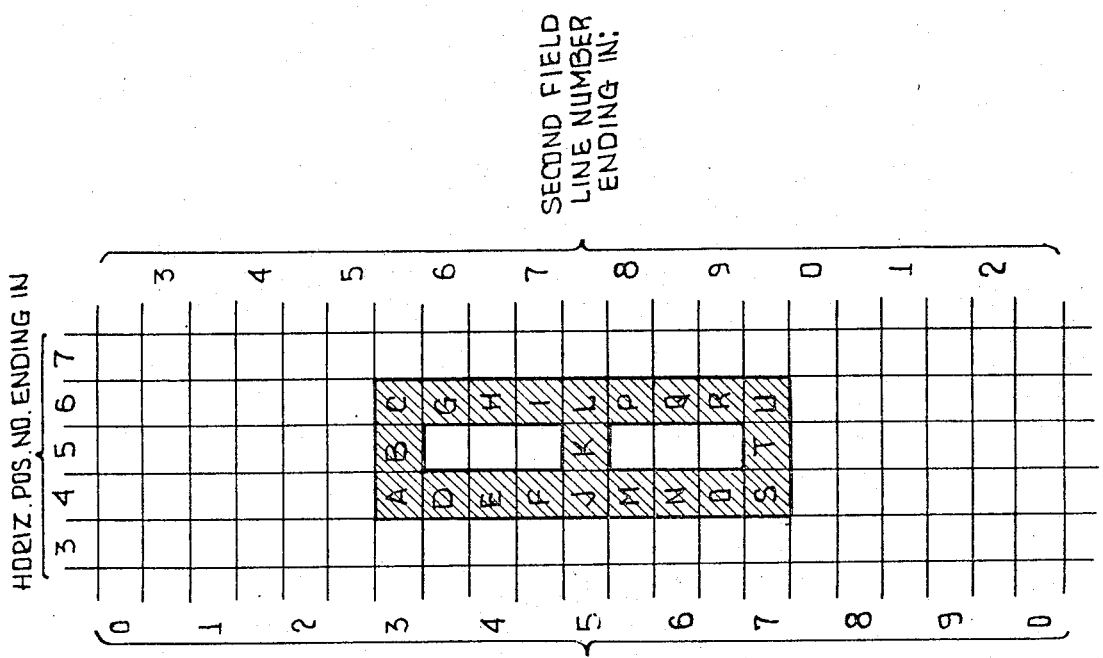

The character vertical size circuit 140 (FIG. 8) provides a gate signal to charcter generator 150 during each horizontal trace of the CRT beam that contains elements of a digit to be "printed" as part of a row or column heading. As best illustrated in FIG. 10, the elements which make up these digits all lie on horizontal lines with numbers ending in 3, 4, 5, 6, 7 in the first field and on interlacing lines with numbers ending in 6, 7, 8 and 9 in the second field. In the circuit 140, the five NAND gates 135, 136, 137, 138, 139 with inputs D3, D4, D5, D6 and D7, respectively, have an additional input from the output of NAND gate 141 with inputs F0̄ and F1̄. Therefore, gates 135 through 139 deliver a "0" output whenever the current line number ends in 3, 4, 5, 6 or 7 and is in the range 0 through 199. NAND gates 142, 143, 144, 145, with inputs D6, D7, D8 and D9, respectively, have another input from the output of NAND gate 146, which in turn has inputs F3̄ and F4̄. Therefore, gates 136, 137, 138, 139 produce a "0" output whenever the line number ends in 6, 7, 8, or 9 and is in the range 300 through 499. Note in FIGS. 2 and 10 that all of the numerals which appear on the screen fall on lines having numbers within the range 0 through 199 and 300 through 499.

Referring specifically to character generator 150 (FIG. 8), a Q̄ output is provided from an inverter 151 at the output of NAND gate 152. When Q̄ is "0," it acts through video generator 60 of FIG. 6 to blank the CRT beam to produce an element of one of the digits which make up the labels for the columns and rows. This happens when the pulse count and line count have a combination of values which causes one of the 13 NAND gates in a NAND gate array to have all positive inputs. The NAND gates in the array are labeled A, B, C, E, H, J, K, L, N, Q, S, T, and U to correspond to grid sections in FIG. 10 as will be described in detail below. One input to each NAND gate in the array comes from one of the three inverters 131, 132, 133 in circuit 120. Specifically, inverter 131 feeds a signal to the five NAND gates A, E, J, N and S in the left column of the array; this signal is "1" when the CBA scaler count ends in 4 and the CRT beam is in the region where digits are to be "printed," as explained in relation to circuit 110. Similarly, inverter 132 feeds a signal to the three NAND gates B, K, T in the middle column of the array; this signal is "1" when the BCA scaler count ends in 5 and the beam is in the region containing numerals. Inverter 133 feeds a signal to the five NAND gates C, H, L, Q and U in the right column of the array; this signal is positive when the CBA scaler count ends in 5 and the beam is in the portion of the image where numerals are to be "printed."

Each of the five outputs of circuit 140 is inverted and fed to one of the five rows in the array of NAND gates. When the line count ends in three during the first field, the first row of gates (A, B, C) receives a "1" input from circuit 140. Similarly, a lne count ending in 4, 5, 6 and 7 results in a "1" input to the NAND gates in the second (E, H), third (J, K, L), fourth (N, Q) and fifth (S, T, U) rows, respectively. During the second field, a line count ending in 6 or 7 effects a positive input to the NAND gate in the second row (E, H), and a line count ending in 8 or 9 effects a positive input to those gates (N, Q) in the fourth row.

FIG. 10 shows the pattern used to form each digit of the numerals which label the columns and rows of grid squares. The digits are formed by blanking out the CRT beam at certain coordinates labeled A through U. The basic digit pattern contains thirteen elements corresponding to the 13 gates in the array. The inputs from circuit 120 restrict the location of these to vertical line numbers ending in 4, 5 and 6; the inputs from circuit 140 restrict their location to horizontal line numbers ending in 3, 4, 5, 6 and 7 during the first field and to the interlacing lines with numbers ending in 6, 7, 8 and 9 during the second field. For simplicity, the same input signals are provided to NAND gates E and H during second field lines with numbers ending in 6 and 7 that are provided to E and H during lines with numbers ending in 4 in the first field. Similarly, the same input sinals are provided to NAND gates N and Q on line numbers ending in 8 and 9 during the second field that are presented on line numbers ending in 6 in the first field. This causes the elements D, E and F in FIG. 10 to act collectively as one element corresponding to gate E in the array. Similarly, elements G, H and I form a common element, M, N and O form a common element, and P, Q and R form a common element. A BCD to decimal converter 153 (for example, Texas Instrument Model SN7442) can have only one "0" output at any time; all other outputs are "1." Therefore, as the coordinates of the CRT beam take on a set of values which correspond to one of the character elements shown in FIG. 10, the array NAND gate corresponding to that element receives all "1" inputs if, and only if, it does not have a "0" input from converter 153. Converter 153 converts the BCD information on its A, B, C, D inputs (from column and row counter 160) to a decimal output by placing one of its ten outputs in the "0" state and the other nine outputs in the "1" state. The relation of the converter outputs to inputs of the 13 array NAND gates can be analyzed more conveniently with the aid of FIGS. 10 and 11a through j. The character elements which are gated for each of the outputs $\bar{0}$ through $\bar{9}$ of converter 153 are shaded in FIGS. 11a through j respectively. The $\bar{0}$ output is an input to all array NAND gates which do not correspond to the character elements that compose the digit "0." The $\bar{1}$ output is an input to all NAND gates which do not correspond to elements that compose the digit "1," etc. The $\bar{0}, \bar{6}, \bar{8}$ and $\bar{9}$ outputs of converter 153 are fed to NAND gate 154 and through inverter 155 to array NAND gates A, C, S and U simply to reduce the number of connections. Otherwise $\bar{0}, \bar{6}, \bar{8}$ and $\bar{9}$ would require separate paths to each of four inputs on all four NAND gates A, C, S and U. For ease of reference, Table III is provided below to indicate which gates in the array receive which output signals of converter 153.

TABLE III

Converter 153 Outputs

| Gate | $\bar{0}$ | $\bar{1}$ | $\bar{2}$ | $\bar{3}$ | $\bar{4}$ | $\bar{5}$ | $\bar{6}$ | $\bar{7}$ | $\bar{8}$ | $\bar{9}$ |
|---|---|---|---|---|---|---|---|---|---|---|
| A | X | X |   |   |   |   | X |   | X | X |
| B |   | X |   |   | X |   |   |   |   |   |
| C | X |   | X | X |   |   | X |   | X | X |
| E |   |   | X | X |   |   |   | X |   |   |
| H |   |   |   |   | X | X |   |   |   |   |
| J |   | X | 1· X | X |   |   |   |   | X | X X |
| K | X | X |   |   |   |   |   |   | X |   |
| L |   |   | X | X |   | X | X |   | X |   |
| N |   | X |   | X | X | X |   | X |   | X |
| Q |   |   | X |   |   |   |   |   |   |   |
| S | X | X |   |   | X |   | X |   | X | X |
| T |   | X |   |   | X |   |   | X |   |   |
| U | X |   |   | X |   | X | X |   | X | X |

At any instant, only one of the inputs from circuit 120 and one from circuit 140 at most can be "1." Therefore, only the one of the 13 array NAND gates having that pair of inputs can produce a "0" output, and it can do so only if all its other inputs from converter 153 are "1." For example, the digit "6" is supposed to appear in the region defined by counts number 314, 315, 316 on horizontal lines numbered 43, 44, 45, 46, 47, 306, 307, 308, 309. The $\bar{6}$ output of converter 153 is the only one that is not positive for these combinations of pulse counts and line counts. The combinatins for which one of the 13 array NAND gates has all "1" inputs, and therefore, feeds a "0" signal to NAND gate 152 are indicated in Table IV:

TABLE IV

| Line Count | Pulse Count | | |
|---|---|---|---|
| | 314 | 315 | 316 |
| 43 |   | X |   |
| 306 | X |   |   |
| 44 | X |   |   |
| 307 | X |   |   |
| 45 | X | X |   |
| 308 | X |   | X |
| 46 | X |   | X |
| 309 |   | X | X |
| 47 |   | X |   |

The "1" output of the NAND gate is fed through inverter 151 and in turn to video generator 60 of FIG. 6 to blank out the beam at coordinates where the digit is to be "printed."

The colunm and row counter circuit 160 includes four multiplexers 161, 162, 163, 164 which for example may be Texas Instruments Model SN74151 and which determine the A, B, C, D inputs to a BCD-to-decimal converter 153 in character generator 150. These multiplexers, therefore, give instructions as to what digit is to be printed. Only five of the eight data inputs to each multiplexer are used, namely, the number 0, 4, 5, 6 and 7 inputs. The states of the A, B, C data selection inputs to multiplexers 161, 162, 163, 164 corresponding to the selected data input terminal are indicated in Table V as follows:

TABLE V

| Data Selection Inputs | | | Selected Data input Terminal |
|---|---|---|---|
| A | B | C | |
| 0 | 0 | 0 | 0 |
| 0 | 0 | 1 | 4 |
| 1 | 0 | 1 | 5 |
| 0 | 1 | 1 | 6 |
| 1 | 1 | 1 | 7 |

A "0" input signal into the selected input data terminal of the multiplexer results in a "0" output, and a "1" results in a "1" output. The outputs of converter 153 are all "1" except for the output whose number corresponds to the BCD number represented by the input signals A, B, C and D, inputs to converter 153. Table VI indicates the states of input signals A, B, C, D which are required to produce a "0" output on each output line.

TABLE VI

| Inputs | | | | Output |
|---|---|---|---|---|
| A | B | C | D | |
| 0 | 0 | 0 | 0 | $\bar{0}$ |
| 1 | 0 | 0 | 0 | $\bar{1}$ |
| 0 | 1 | 0 | 0 | $\bar{2}$ |
| 1 | 1 | 0 | 0 | $\bar{3}$ |
| 0 | 0 | 1 | 0 | $\bar{4}$ |
| 1 | 0 | 1 | 0 | $\bar{5}$ |
| 0 | 1 | 1 | 0 | $\bar{6}$ |
| 1 | 1 | 1 | 0 | $\bar{7}$ |
| 0 | 0 | 0 | 1 | $\bar{8}$ |
| 1 | 0 | 0 | 1 | $\bar{9}$ |

Figure 12:
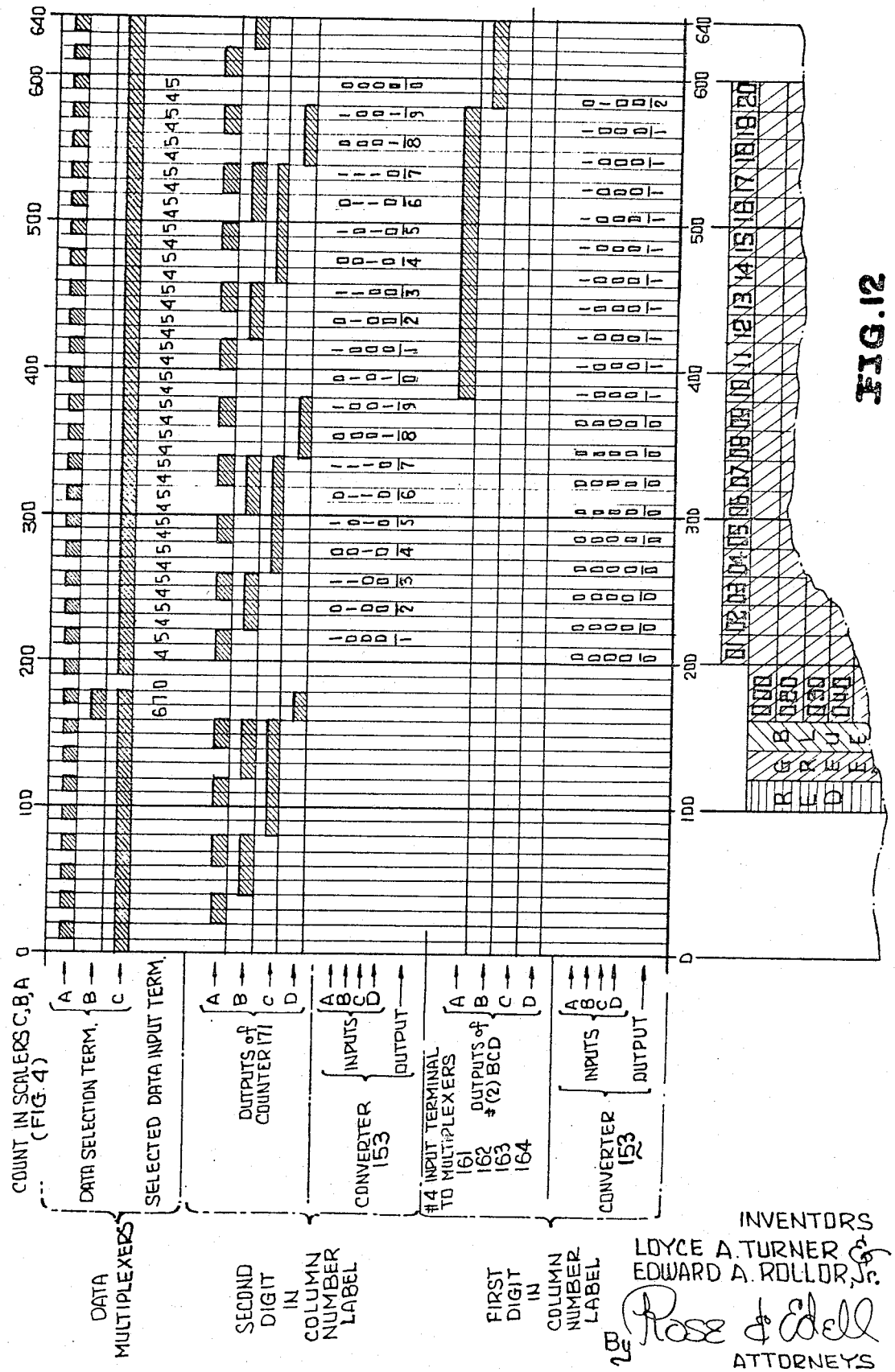

FIG. 12, in conjunction with FIG. 8, illustrates how the digits which compose the column number labels are selected by column and row counter 160. The count in the CBA scaler set is laid out across the top of the Figure, from 0 to 640. The "0" or "1" (shaded) condition of the A, B, C inputs to multiplexers 161–164 is shown in the next three rows. The A input to each multiplexer is $B_A$, the output of the first binary stage in scaler B (FIG. 4). It goes from "0" to "1" the first time scaler A goes from a count of 9 to a count of 0. It goes from "1" to "0" the second time, and alternates on every 10-th count. Input B to each multiplexer is fed from inverter 165 whose input is "0" only when it receives a "0" signal from either of two NAND gates 166 (having inputs C1 and B6) and 167 (having the inputs C1 and B7). Therefore, input B is "1" only during pulse counts 160 through 179. The C input to each multiplexer is the output of NAND gate 168 having inputs C1 and B8. Therefore, the C input is in the "0" state during pulse counts 180 through 189, and in the "1" state at all other times.

The selected data input terminal number for each multiplexer is shown on the next line of FIG. 12, and is based on the logic of Table VI. Note that the column number labels all are between count 200 and 600 (FIG. 2). Other areas of the row that contains the column label numbers are blanked out by other circuitry and do not require consideration here.

The second digit in each column number label is produced by the No. 5 data inputs to multiplexers 161–164. The multiplexers receive their data inputs from BCD counters 171, 172, 173, 174. The BCD counters may correspond to Texas Instrument Model SN7490. The A, B, C, and D outputs from counter 171 provide the No. 5 inputs to multiplexers 161, 162, 163 and 164, respectively. The A output from counter 171 shifts from "0" to "1" on the first negative impulse of $B_A$ on input $A_{IN}$, which occurs at the beginning of the 20th pulse count in FIG. 4; this A output alternates on every 20th count thereafter. The B output from counter 171 switches each time the A output goes from "1" to "0," the C output switches each time the B output goes from "1" to "0," and the D output switches each time the C output goes from "1" to "0." All four outputs go to zero on clock pulse count 180 because of NAND gate 168 (with inputs C1 and B8) whose output is inverted by inverter 169 which feeds the reset input terminal of counter 171. The counter is zeroed again by its own internal reset when the stored count goes from 9 to 0. FIG. 12 indicates that this occurs at count 380 and 580 in the CBA scaler system. The inputs to converter 153 which follow the multiplexer outputs are shown in "0," "1" terminology in FIG. 12 along with the resulting converter 153 output. Note that the number of the converter output is identical to the digit produced on the CRT, as shown at the bottom of the figure.

The first digit in each column number label is produced by the No. 4 inputs to the multiplexers. The No. 4 inputs to multiplexers 161 and 162 are the A and B outputs, respectively, of counter 172. The A output of counter 172 goes from "0" to "1" when the D output of counter 171 goes from "1" to "0." It does not do this at count 180, however, because counter 172 also receives a reset signal from the inverter 169 at this time. The D output of counter 171 goes to "0" again at the beginning of count 380, and once again at count 580. Consequently, the A output of counter 172 is "1" between pulse counts 380 and 580. The B output of counter 172 goes to the "1" state when the A output of that counter returns to the "0" state on count 580. The No. 4 inputs to multiplexers 163 and 164 are grounded ("0"). The BCD information delivered to the inputs of converter 153 is shown in FIG. 12 along with the gated output. Note that the number of each output is the same as the digit to be printed in that column.

Figure 13:
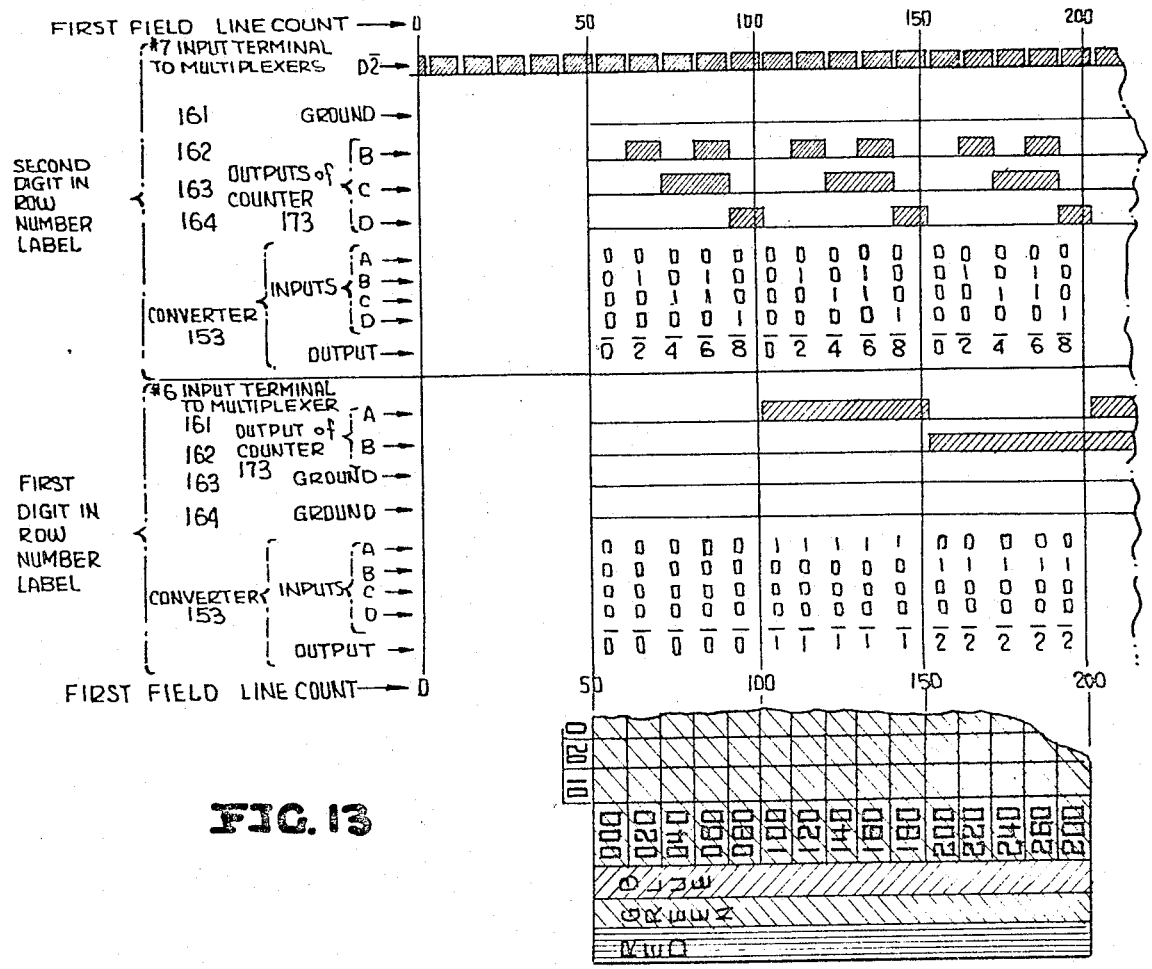
Figure 13A:
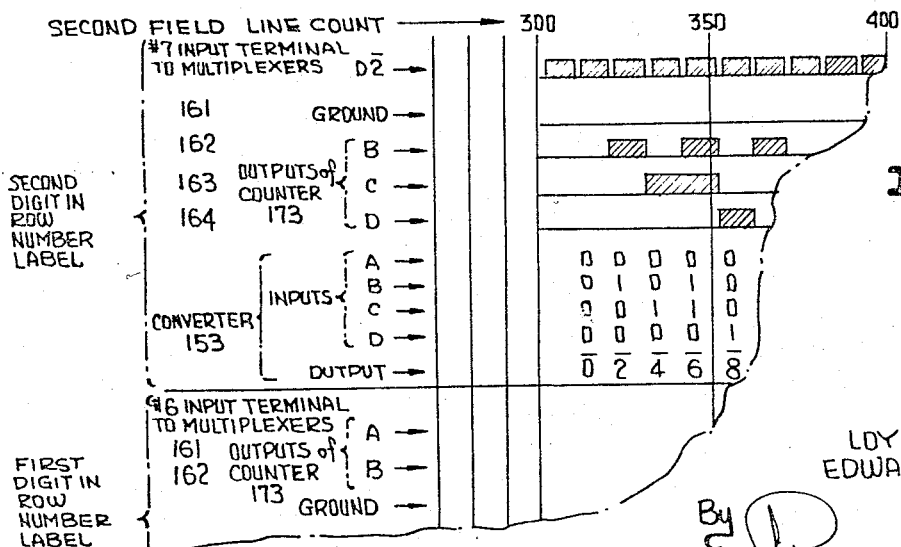

FIG. 13, along with FIG. 8, illustrates how the digits which form the row number labels are selected by column and row counter 160. Counter 173 receives signal $\overline{D2}$ on its B input line. Therefore, it performs a divide-by-five function and resets all outputs to "0" each time a new count is received after a count of four. The No. 4 input to multiplexer 161 is ground ("0") and the No. 7 inputs to multiplexers 162, 163 and 164 are the B, C and D outputs, respectively, of counter 173. The reset input of counter 173 is received from inverter 175 which is driven by two NAND gates 176 (with inputs F0 and E5) and 177 (with inputs F3 and E1). Therefore, all outputs are held in the "0" state during line counts 50 through 59 and 310 through 319. FIG. 12 illustrates that the No. 7 input to the multiplexers is gated during the pulse counts 170 through 179 to enclose the column containing the second digit of each row label number. When the line count is 52 through 61, the No. 7 input is "0" to each multiplexer producing a 0, 0, 0, 0 input to converter 153 and consequently, a $\overline{0}$ output. At line 62, $\overline{D2}$ becomes negative and the B output of counter 173 goes to the "1" state, causing the No. 7 inputs to the multiplexers to produce a 0, 1, 0, 0 output and converter 153 provides a $\overline{2}$ output. At line count 72, the B output of counter 173 goes to "0" and drives the C output to "1" producing 0, 0, 1, 0 outputs from the multiplexers and a $\overline{4}$ from converter 153. Similarly, line count 82 effects a $\overline{6}$, and line count 92 an $\overline{8}$ from converter 153. Count number 102 produces the fifth input pulse to the scaler since the time at which it was last reset during line counts 50 through 59; thus line count 102 causes all counter 173 outputs to go to "0." Digits "0," "2," "4," "6" and "8" repeat again and counter 173 once again resets at line count 152 and repeats the series once more. In the second field, the NAND gate 177 holds all outputs in the "0" state during line counts 310 through 319, and the sequence of events of the first field is repeated.

The No. 6 inputs to multiplexers 161 and 162 are the A and B outputs, respectively, of counter 174. The No. 6 inputs to multiplexers 163 and 164 are grounded ("0"). FIG. 12 indicates that the No. 6 inputs are gated during a pulse count 160 through 169. FIG. 13 indicates how the No. 6 inputs vary with line count and produce the proper output from converter 153 for the first digit in each row number label. FIG. 12 shows that the No. 0 inputs to all four multiplexers are gated on the pulse count of 180 through 189, which includes the column containing the third digit of the row number labels. Note that this digit is 0 in all cases, and that the No. 0 inputs of all four multiplexers are grounded to produce a 0, 0, 0, 0 input to converter 153 and a $\overline{0}$ output therefrom.

Referring now to FIG. 14 and the receiver-memory interface circuit, the 60 Hertz vertical trigger pulses from circuit 55 (FIG. 5a) are fed to 4-input NAND gate 181, the "write" scaler 182, a set of nine 2-input NAND gates 191 through 199, an individual 2-input NAND gate 183, and through an inverter 184 to another set of nine 2-input NAND gates 201 through 209. The output of 2-input NAND gate 183 drives flip-flop 185, which may be Motorola Type MC851, and which stretches the short 60 Hz pulses to produce an approximate square wave (equal duration positive and negative half cycles). This is the interrogate pulse signal, which is fed to the transmitter (FIG. 15) for modulation onto a carrier prior to transmission through the system to remote transponders. The "write" scaler 182 addresses the "RED" and "GREEN" memories (FIG. 17) during each eighth vertical retrace so that the reply information from a remote transponder, corresponding to eight interrogate pulses, can be entered into one memory position. The "read" scaler 200 addresses all memory elements sequentially during each vertical scan to read out the information as to what color each grid square should be. The two sets of nine NAND gates thus act as a nine pole double throw electronic switch, connecting the memory elements to the "write"

inputs during vertical retrace and to the "read" outputs at all other times.

The "write" scaler 182 consists of three counters 186, 187, 188. Counters 186 and 188 (for example Texas Instrument Model SN7493) are four stage binary counters; counter 187 (Texas Instrument Model SN7490) resets on an internal count 0f 10. The D output of counter 186 is one input (Ax) to NAND gate 191 whose other input is the 60 Hz signal from circuit 55. The output of NAND gate 191 therefore delivers an inverted signal ($X_A$) relative to the D output, which changes state on each eighth vertical trigger pulse. Similarly, the inverted A, B, C, D outputs of counter 187 provide the $X_B$, $X_C$, $X_D$ and $X_E$ inputs respectively to the "write" memory address, and the inverted A, B, C, D outputs of counter 188 are the $Y_A$, $Y_B$, $Y_C$ and $Y_D$ inputs to the "write" memory address (FIG. 17). $X_A$ changes state on the trailing edge of every eighth 60 Hz pulse, changing the nine-bit binary number represented by $X_A$, $X_B$, $X_C$, $X_D$, $X_E$, $Y_A$, $Y_B$, $Y_C$ and $Y_D$ and thus changing the memory position being addressed. The D output of counter 186 changes state after every eighth vertical trigger pulse, and counter 187 receives a pulse every second change in the D output of counter 186. Counter 187 resets internally after 10 negative impulses are applied to its input; therefore, the D output of counter 187 changes after $(8) \cdot (2) \cdot (10) = 160$ vertical trigger pulses. Counter 188 divides this by 16 and produces a change on its D output after every $(160) \cdot (16) = 2,560$ vertical trigger pulses. Since the vertical trigger occurs at a 60 Hertz rate, the time for a complete "write" cycle is $(2,560/60) = 42\ 2/3$ seconds. The number of memory locations addressed is $(2,560/8) = 320$, although only 300 are actually used to store transponder reply data, since only 300 grid squares are displayed on the CRT. Once again it is to be stressed that these numbers are by way of a specific example only and should not be construed as limiting the scope of this invention. The information is stored in the memory in the same chronological order in which it is to be retrieved as the CRT beam traces the image of the grid pattern. Counters 186 and 187 address 20 memory locations as the $X_A$, $X_B$, $X_C$, $X_D$ and $X_E$ in inputs change, corresponding to the first row of grid squares in FIG. 2. The $Y_A$, $Y_B$, $Y_C$ and $y_D$ inputs then change from 0,0,0,0 to 1,0.0.0 and counters 186 and 187 change the X inputs to address another 20 memory locations which correspond to the second row of grid squares in sequence.

When "write" scaler 182 has addressed 300 memory locations, the A, B, C, D outputs of counter 188 to go 1,1,1,1 for the next $(8) \cdot (20) = 160$ vertical trigger pulses. During this period, the counter 188 outputs cause a "0" output from NAND gate 189 to which they are inputs. Gate 189 feeds NAND gate 183 whose output is an inversion of the 60 Hz vertical trigger signal for $(8) \cdot (2) \cdot (10) \cdot (15) = 2,400$ vertical triggers, but it is inhibited for the next $(8) \cdot (2) \cdot (10) \cdot (1) = 160$ vertical triggers. The output of NAND gate 183 triggers flip-flop 185 2,400 times, producing 2,400 consecutive interrogate pulses. However, no interrogate pulses are produced during the succeeding 160 vertical triggers, allowing transponders to reset to a count of zero during this inverval. Thus, if a counter in a remote transponder should skip a count, or add an extra count due to spurious pulses, it would get back in step at the beginning of the next interrogate cycle. When the A, B, C, D outputs of counter 188 go from 1,1,1,1 to 0,0,0,0 at the end of 2,560 horizontal triggers, the propagation time delay through counters 186, 187, 188 causes the change (from "0" to "1") at the output of NAND gate 189 to arrive too late to gate the first 60 Hz pulse in the next train at the 2-input NAND gate. Therefore, a capacitor 211 is used to bypass the D output of counter 188 around NAND gates 189, 183 and directly to an input of the flip-flop 185. Thus, the first interrogate pulse in the next train appears on the delayed trailing edge of the 2,560th pulse.

The "read" scaler consists of four counters 212, 213, 214 and 215. Counters 212, 213, and 215 are straight binary counters for example Texas Instrument Model SN7493. Counter 214 resets on each tenth internal count and may be a Texas Instrument Model SN7490. The input to counter 212 is $B_A$, the first output of the second stage in the clock scaler (FIG. 4) which produces a negative impulse after every 20th clock pulse. The counters 212, 213, 214 and 215 are held in reset during the 100th through 199th clock pulses of the 50th and 312th lines by NAND gates 216 (with inputs F0, E5, D0, C1) and NAND gate 217 (with inputs F3, E1, D2, C1). The counter begins to count on the 200th pulse in each of these lines. The A, B, C, D outputs of counter 212 and the A output of counter 213 provide inputs $A_x$, $B_x$, $C_x$, $D_x$ and $E_x$ to NAND gates 201, 202, 203, 204 and 205, respectively. The inverted 60 Hz signal from FIG. 5a is the other input to each of these NAND gates, so that these gates provide signals $X_A$, $X_B$, $X_C$, $X_D$ and $X_E$ which address memory elements (FIG. 17) for readout purposes on the negative portion of the 60 Hz signal, i.e., during the period when the CRT beam sweeps the screen. Elements $X_A$, $X_B$, $X_C$, $X_D$ and $X_E$ receive a five-bit binary number which takes on all 32 values consecutively begining with a pulse count of 200 in one horizontal sweep and ending with a count of 199 in the next horizontal sweep. The first 20 binary numbers are memory addresses which have received data when they were addressed by the "write" scaler. They correspond to the 20 columns of grid squares. Counter 214 is a divide by 10 scaler whose input is the A output of counter 213. It therefore produces an output pulse at the end of every 10 complete cycles of the 32-count scaler system consisting of counters 212, 213, i.e., after 10 horizontal sweeps corresponding to the image (in one field) of one row of grid squares.

The A, B, C, D outputs of counter 215 represent the count of rows of grid squares in the vertical sweep, since the input to counter 215 is the output of counter 214, whose output changes on every 10th horizontal sweep. The A, B, C, D outputs of counter 215 are inputs to NAND gates 206, 207, 208, 209 whose outputs are the $Y_A$, $Y_B$, $Y_C$, $Y_D$ inputs to the "read" memory address. The first 15 numbers of this count correspond toche 15 labeled rows of grid squares, and the last is an unused section of the memory.

Thus it it seen that between two successive 60 Hz pulses from FIG. 5a (corresponding to one field of the CRT display), all 300 memory sections containing stored data are addressed in order, each at the proper time corresponding to the trace of the CRT beam across the appropriate grid square. The $X_A$, $X_B$, $X_C$, $X_D$, $X_E$, $Y_A$, $Y_B$, $Y_C$ and $Y_D$ terminals each connect to two memories, the "GREEN" memory and the "RED" memory (FIG. 17), which are addressed simultaneously. Since the "read" scaler system 200 is reset on clock pulse counts of 050 and 312, the scan of the memory after every second cycle of the 60 Hz vertical trigger pulse train causes the information to be displayed in the interlaced second field, producing 30 complete frames per second.

During every eighth 60 Hz (vertical trigger) pulse, the "write" scaler addresses one of these same memory elements in both memories for the purpose of updating the information in that element. The new information is obtained by analysis of the last eight pulses received from the remote transponder in reply to interrogate pulses. During the interrogation of one remote transponder, eight interrogate pulses are sent out, and the receiver (FIG. 15) "looks" for a reply pulse of either of the reply frequencies (2.1 KHz or 1.31 KHz). Only four possible events listed in Table VII, can occur regarding the received reply pulses:

TABLE VII

| Condition | $f_1$ (1.31 KHz) | $f_2$ (2.1 KHz) | Displayed Color |
|---|---|---|---|
| Alarm | Yes | No | Red |
| No Alarm | No | Yes | Green |
| Malfunction | Yes | Yes | Blue |
| Malfunction | No | No | Blue |

Only frequency $f_1$ should be received in case of a true alarm, and only frequency $f_2$ should be received under no alarm conditions. Reception of neither or both frequencies indicates malfunction. The eight addresses assigned to each transponder are listed in Table VIII

TABLE VIII

| Address | Assigned Function |
|---|---|
| 0 | Check for $f_2$ (Green) |
| 1 | Check for $f_1$ (Red) |
| 2 | Monitored Function |
| 3 | None |
| 4 | Check for $f_2$ (Green) |
| 5 | Check for $f_1$ (Red) |
| 6 | Monitored Function |
| 7 | None |

When the decoder in a transponder recognizes a count corresponding to the begininng of the eight binary numbers assinged to that transponder, the number 0 address is interrogated, which is a check for $f_2$. The transponder always transmits $f_2$ on this address unless it is malfunctioning. Similarly, the next interrogate pulse corresponds to the number 1 address, which causes transmission of $f_1$. The next pulse corresponds to address number 2, which "looks" at the monitored function. The next address (number 3) is unassigned in the illustrated and described example. The number 4, 5, 6 and 7 addresses in the transponder are a one-for-one sequential repeat of the 0, 1, 2, 3 addresses. The purpose of this "second scan" is to permit comparison of the data received on the two successive scans as a further check on performance. If an alarm were indicated at one address on the first scan and not indicated on the second scan, it would very probably be due to spurious pulses. The grid square corresponding to this transponder is displayed as blue whenever the information received from any address of the transponder disagrees with the information received from the other address assigned to that function. If the disagreement is due to a spurious pulse, it is extremely unlikely that it will appear on the next complete scan of the system, and the corresponding grid square should change back to green or red in accordance with alarm status.

The eight-address cycle described above is by way of example only. The repeat scan may be eliminated if desired, thereby permitting more functions to be monitored. Also $f_1$ and $f_2$ checks may be eliminated and these addresses would be used for other functions. It is also to be understood that other transponders, with different frequencies, may be responding simultaneously to the same address.

As the "write" scaler counts 60 Hz pulses, the A, B, C outputs of counter 186 provide the A, B, C inputs to decoders 220, 218 and 219. These, for example, may be Texas Instrument Model SN7442. As long as the D input of each decoder is in the "1" state (positive), outputs 0, 1, 2, 3, 4, 5, 6 and 7 are in the "1" state. Whenever the D input is in the "0" state, only one of these eight outputs is in the "0" state, namely the one whose number is the binary number represented by the A, B, C inputs. For present purposes only the 0, 1, 2, 4, 5 and 6 outputs are used, and these obey the following truth table:

TABLE IX

| Inputs | | | Selected "0" State |
|---|---|---|---|
| A | B | C | Ouput |
| 0 | 0 | 0 | 0 |
| 1 | 0 | 0 | 1 |
| 1 | 1 | 0 | 2 |
| 0 | 0 | 1 | 4 |
| 1 | 0 | 1 | 5 |
| 0 | 1 | 1 | 6 |

The 1, 2, 4, 5 and 6 outputs of decoder 220 provide inputs to the decoders in the "GREEN" column labeled 221, 222, 223, 224, 225 and 226, respectively and also labeled 0, 1, 2, 4, 5 and 6, respectively. As the eight interrogate pulses for a transponder are sent out, the GREEN decoders, which may be Texas Instrument Model SN7475's, receive inputs as follows:

TABLE X

| Interrogate Pulse Number | Selected Decoder for "0" Input | |
|---|---|---|
| | D Input "0" | D Input "1" |
| 0 | 0 (221) | |
| 1 | 1 (222) | |
| 2 | 2 (223) | |
| 3 | | |
| 4 | 4 (224) | |
| 5 | 5 (225) | |
| 6 | 6 (226) | |
| 7 | | |

Thus it is seen that if a "1" is received on the D input of decoder 220 from the "GREEN" memory, all of the "GREEN" decoders receive "1" inputs from decoder 220. If a "0" appears on the D input during the zero-th interrogate pulse, decoder 221 receives a "0" input, etc. The "RED" decoders 231, 232, 233, 234, 235 and 236 receive inputs from decoder 219 in a similar manner when the D input to counter 219 from the "RED" memory is in the "0" state. Decoder 218 follows the same pattern except that its D input is "0" only during line counts 250 through 259 in the first field and 510 through 519 in the second field, due to NAND gate 227 (with inputs F2, E5) and NAND gate 228 (with inputs F5, E1). The outputs of decoder 218 feed the clock (C) inputs of the red and green decoders. When the C input to a red or green decoder is high ("1" state), the Q output follows the D (data) input and the $\overline{Q}$ output is the inverse. Whenever the C input goes low ("0" state), the Q and $\overline{Q}$ outputs maintain the last status they had before the transition until such time as the C input goes high again. The red and green decoders thus serve as temporary storage for all of the return information from one transponder while certain checks are made prior to transfer of the information to the RED or GREEN memory. As the C input of each red or green decoder is "gated" in sequence, the decoder "unlatches." One GREEN and a corresponding RED decoder are unlatched during line counts 250 through 259 in the first field and 510 through 519 in the second field as explained previously. At this time the unlatched pair of decoders update their output signals to correspond to current input information received from decoders 220 and 219. The information from decoders 220 and 219 depends on the state of their D inputs. The D input to decoder 220 is "1" if the 2.1 KHz reply frequency is received at that time, and "0" if not. Similarly, the D input to decoder 219 is "1" if the 1.31 KHz reply frequency appears in the receiver at that time and "0" if it does not. The time at which the red or green decoders are unlatched occurs very close to the beginning of the next vertical trigger. Therefore, a near maximum time interval is allowed for the propagation of the interrogation pulse to the remote transponder and propagation of the reply pulse to the receiver before the outputs of the receiver are analyzed.

The output 233Q (the Q signal from decoder 233) is input to NAND gate 241 whose output is inverted by inverter 242 to provide a signal which causes a "1" to be written in the "RED" memory when address number 2 receives the alarm frequency. Similarly, the output 223Q is an input to NAND gate 243 whose output is inverted by inverter 244 to provide output $G_{wl}$ which causes a "1" to be written in the GREEN memory when address number 2 receives the NO ALARM frequency.

Just to the left of the GREEN decoders is shown the logic circuitry which checks to see whether one, and only one, of the reply frequencies was received from the number 2 and number 6 addresses of the transponder, and that the same answer is received from the number 6 address as is received from the number 2 address. If both or neither frequencies appear in the receiver, or the first and second scans do not agree, an equipment malfunction or spurious signal is indicated. The circuitry with inputs 223$\overline{Q}$, 233Q, 226$\overline{Q}$ and 236Q verifies that one, and only one, reply frequency is received. The 233Q output and the 223$\overline{Q}$ are fed to NAND gate 247 and their complements are inputs to NAND gate 246. The outputs of these two NAND gates are inputs to a third NAND gate 248 whose other input is normally held positive, but can be grounded via an external switch in order to hold the output positive and disable this malfunction detection circuitry. If only the 2.1 KHz reply frequency is received (indicating no alarm), the receiver delivers a positive signal to the D input of decoder 220, wihle the D input of decoder 219 goes negative, so that both 223$\overline{Q}$ and 233Q are "0." Therefore, NAND gate 246 with the inversion of these two inputs has a "0" output, and since wired-OR logic is used, the "0" signal over-rides the "1" output of NAND gate 247 with the non-inverted inputs, making the output of NAND gate 248 "1". If only the 1.31 KHz reply frequency is received, both 223$\overline{Q}$ and 233Q are "1," and NAND gate 247 produces the same end effect. However, if neither or both frequencies are received, 223$\overline{Q}$ and 233Q will have opposite polarity, and both NAND gate 246 and 247 have one "0" input. Therefore, both gates will have "1" outputs and the output of NAND gate 248 is "0," so long as the disable switch is not activated. Identical circuitry is provided for a similar check of this function on the second scan of the transponder using inputs 236Q and 226$\overline{Q}$. The final outputs of the two circuits are connected together, so a "0" output from either indicates a malfunction. The disable switch is common to both circuits.

Identical logic circuitry checks to see if the same frequency is received on both the first and second scans of the monitored function. The inputs 223$\overline{Q}$, 226$\overline{Q}$, 233$\overline{Q}$ and 236$\overline{Q}$ are used in a similar manner to that just described. The first two 223$\overline{Q}$ and 236$\overline{Q}$ inputs produce a "0" on the output line of NAND gate 248 if a "GREEN" reply signal (2.1 KHz received) occurs from either the number 2 or number 6 address but not from the other. The 233$\overline{Q}$ and 236$\overline{Q}$ inputs have the same effect if a "RED" return signal is received from one of these addresses but not the other. An external disable switch is provided also for this malfunction detection circuitry.

Addresses number 0 and 4 in the transponder are assigned the function of verifying the ability of the transponder to transmit the normal "GREEN" telemetry signal (2.1 KHz frequency) and addresses 1 and 5 are supposed to verify the ability to transmit the "RED" alarm signal (1.21 KHz). Therefore, an eight-input NAND gate 251 is employed, with inputs from the Q outputs of decoders 221, 224, 232, 235 and the $\overline{Q}$ outputs of decoders 222, 225, 231 and 234. The only condition which will produce all positive inputs to NAND gate 251 is that in which all four check pulse addresses respond with their assigned frequency and do not transmit the other frequency. Thus, the output of NAND gate 251 will be "0" only if all check pulses are on the correct frequency, and "1" otherwise. This output is one input to NAND gate 252 whose other input is normally at +5 volts ("1"), but can be grounded by a DISABLE switch. The output of NAND gate 252 is "1" only if all check pulses appear on the right frequency. It is connected along with the other malfunction detection circuitry outputs to a second input of NAND gate 243.

A third input to NAND gate 243 is from a five-input NAND gate 253 whose inputs are 223$\overline{Q}$, 226$\overline{Q}$, 233$\overline{Q}$ and 236$\overline{Q}$ and a disable input. The disable input is normally held at +5 volts during operation. The only condition under which NAND gate 253 can have a "0" output and prevent NAND gate 243 from "writing 1" is that in which neither the 2.1 KHz nor the 1.31 KHz reply frequency is received on either transponder address assigned to the monitored function (addresses 2 and 6). This circuitry can be disabled by a switch to determine whether a malfunction is due to the absence of a reply pulse on either frequency on either address of the monitored functions.

A fourth input to NAND gate 243 is signal $R_{sl}$, the "1" output of the RED memory position being addressed. Whenever an alarm appears in the RED memory, the $R_{sl}$ input to NAND gate 243 is "0" when a memory element with an alarm is addressed. Therefore, the $G_{wl}$ signal is held "1," preventing the writing of a "1" in the corresponding element of the GREEN memory, even if a "NO ALARM" reply signal is received from the transponder.

The $R_{w1}$ signal provides a "1" signal to the "RED" memory (FIG. 16) whenever an alarm is to be stored. A "1" $R_{w1}$ signal "writes" a "1" in the memory element being addressed by the "WRITE" scaler if certain conditions are met. The $R_{w1}$ signal is the inverted output of a three-input NAND gate 241 and therefore writes a "1" in the RED memory element being addressed only when all of the inputs to NAND gate 241 are "1." Similarly, the $G_{w1}$ signal writes a "1" in the GREEN memory element being addressed at a particular instant only if all inputs to NAND gate 243 are positive at that instant.

One input to NAND gate 241 is 233Q, which is "1" only when an alarm signal is received from the transponder regarding the status of the monitored function. The remaining two inputs are also inputs to NAND gate 243. One is the output of the malfunction check circuitry previously described and prevents the writing of a "1" in either "RED" or "GREEN" memory if a malfunction is indicated. This same line receives a signal from an inverter 250 on the number 6 output of a decoder 254 (e.g., Texas Instrument Model SN7442), which receives its input from counter 255 (e.g., Texas Instrument Model SN7490). Counter 255 receives its input from inverter 256 which is fed by NAND gate 257 whose inputs are $B_4$ and the number 7 output of decoder 254. Counter 255 is reset by NAND gate 181 whose inputs are the 60 Hz signal from circuit 55 and the A, B, C outputs of counter 186. These four inputs are all "1" only when address number 7 in the transponder has been interrogated and the next interrogate pulse is generated. This occurs on every eighth vertical retrace and causes the reset input to counter 255 to become "0," allowing the counter to count; at all other times a "1" signal appears on the reset input, holding the A, B, C and D outputs in the "0" state. During vertical retrace, then, counter 255 counts "0" pulses from $B_4$, which occur on the trailing edge of pulse counts ending in 00, 20, 40, 60 and 80. On the sixth count into the counter (trailing edge of horizontal pulse count number 120), a "0" signal appears on the number 6 output of decoder 254 and remains until the seventh count. The inverted signal is applied along with the outputs of the malfunction detection circuits to one input of NAND gate 241 and to one input of NAND gate 243. Therefore, the only time at which these two NAND gates (241, 243) can have all positive inputs is during horizontal pulse counts 121 through 140 in the first horizontal sweep during vertical retrace. The selection of this time for the gating of the "WRITE" signals is somewhat arbitrary. The seventh count into counter 255 produces a negative signal on output number 7 of decoder 254, which prevents passage of additional pulses from $B_4$ through NAND gate 257 and inverter 256 to the counter. This stops the action of the counter and decoder until the counter is reset again after eight additional vertical retraces.

$B_4$ and A6 are inputs to NAND gate 258 whose output is inverted by inverter 259 and fed to both NAND gates 241, 243. This places the further restriction on these NAND gates that all inputs are positive only during horizontal counts ending in 16, 36, 56, 76 and 96. The combined effect of this input and the input which is positive only during counts 121 through 140 restricts the time at which the $R_{w1}$ and $G_{w1}$ outputs can be "1" to horizontal count number 136 on the first horizontal sweep during each eighth vertical retrace. This is the only time at which a "1" can be written in either memory.

A6 and the inverted $B_4$ signal (from inverter 261) are inputs to a NAND gate 262 whose output is inverted by inverter 263 and fed to one input of NAND gate 264. The other input to gate 264 is the inverted number 6 output of decoder 254. The output of NAND gate 264 is "0" only a horizontal count of 126 during the first horizontal sweep of every eighth vertical retrace. This is one input to NAND gate 265. The second input to gate 265 is held at +5 volts ("1") normally and is selectively grounded to inhibit the circuit and clear the memory. When the first input is "0," the $G_{wo}$ output signal from gate 265 becomes "1" and a "0" is written into the GREEN memory element being addressed by the WRITE scaler. Normally, the $G_{wo}$ signal is also fed to the $R_{wo}$ input to the RED memory. An external switch can be opened to prevent this. Normally, the CLEAR MEMORY signal is held at "1," but can be grounded by pressing a springloaded switch. This causes a "1" signal on both $R_{wo}$ and $G_{wo}$, writing a "0" into the red memory. As a consequence, all grid squares turn blue. The ALARM HOLD is normally grounded, but is raised to B+ when a switch is thrown, causing a normally negative output to $R_{wo}$. This overrides any positive output on the $G_{wo}$ NAND gate and prevents writing a "0" in either memory. Therefore, an ALARM (RED "1") or MALFUNCTION (RED "1" and GREEN "1") cannot be erased under these conditions. The GREEN "0" is written normally on horizontal pulse count number 126 of the first horizontal sweep after each eighth vertical retrace.

Figure 15:
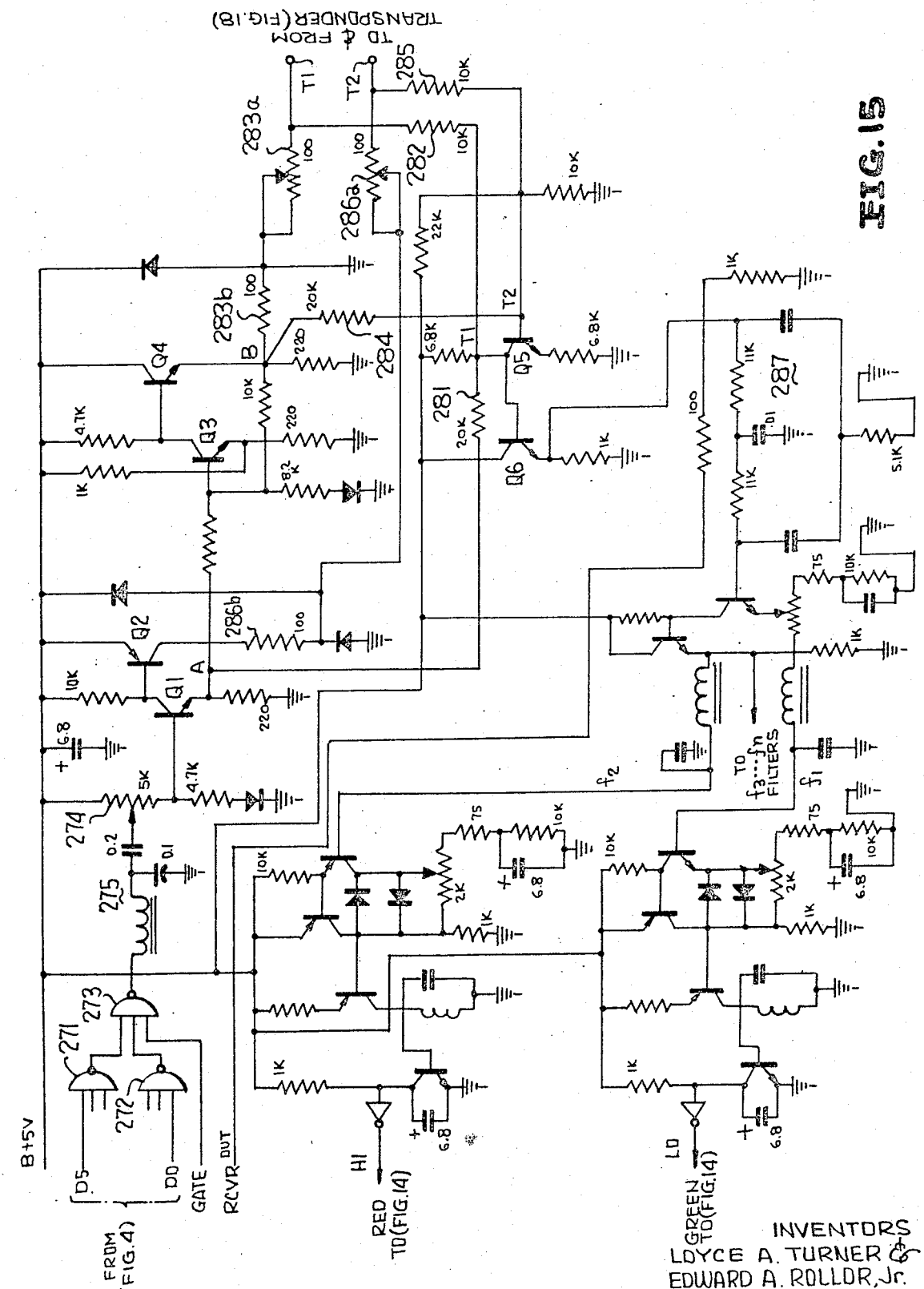

Referring now to the transmitter-receiver circuit illustrated in FIG. 15, two NAND gates 271, 272 used as inverters have inputs D0 and D5, respectively. Their outputs are applied to NAND gate 273 whose third input is the interrogate pulse from the receiver/memory interface (FIG. 14). The interrogate pulse is a 60 Hertz square wave (approximately 8 milliseconds positive phase). D During the positive half of the interrogate signal, the output of NAND gate 273 is controlled only by the inverted D0 and D5 signals, which produce a "1" pulse at the NAND gate output on every fifth horizontal sweep, for a frequency of (15,750/5) = 3,150 Hz. During the negative phase of the interrogate signal, the output of NAND gate 273 is held in the "1" state, and the D0 and D5 signals have no effect. The interrogate signal thus modulates the 3.15 KHz carrier frequency to generate pulses of the carrier at a 60 Hz rate. A tuned circuit 275 passes the 3,150 Hz frequency to a 5K potentiometer 274 which provides a means for gain adjustment. The two following NPN and PNP transistors Q1 and Q2 comprise a feedback stabilized amplifier with very high current gain. The succeeding two NPN transistors Q3, Q4 act as an inverter. If the signal at point A (the emitter of Q1) is +E, then point B (the emitter of Q4) is held at −E, and a voltage 2E is applied to the bridge between points A and B. This bridge, for purposes of analysis, is shown in greater detail in FIG. 16.

The bridge includes a 20K resistor 281 connected between point A and junction J1 at the collector of an NPN transistor Q5. A 10K resistor 282 is connected between junction J1 and input-output terminal T1. A 100 ohm potentiometer 283a (FIG. 15) and a 100 ohm resistor 283b are connected in series between terminal T1 and point B; in FIG. 16, potentiometer 283a and resistor 283b are approximated as a 150 ohm resistor 283. Another 20K resistor 284 is connected between point B and a junction J2 at the base of Q5. Another 10K resistor 285 is connected between the J2 input and output terminal T2. A 100 ohm potentiometer 286a and a 100 ohm resistor 286b are connected in series between T2 and A; thse components are approximated by a 150 ohm resistor 286 in FIG. 16.

The bridge network acts as a directional coupler. The interrogate signal appears across the 300 ohm (approximately) wire pair at $T_1$, $T_2$ (which acts as a balanced line) at a level $(E/2) + (E/2) = E$. However, the signal applied to the collector of the transistor is determined by the voltage divider at one-third of the way between $-(E/2)$ and $+E$, or ground. The signal applied to the base of Q5 is one-third the way from $(E/2)$ to $-E$, or also ground. Therefore, no signal is applied to Q5 as a result of the interrogate signal being transmitted out on the wire pair. The signal coming into the circuit from a remote transponder at a level $e$ may be thought of as a voltage $+(e/2)$ on one wire and $-(e/2)$ on the other relative to the virtual ground of the balanced line. The points A and B look like ground to the signal coming in; therefore, the applied voltages at the collector and base of Q5 are $+(e/3)$ and $-(e/3)$, respectively, so that a net output signal of $2/3\ e$ is applied across emitter follower Q6 to the receiver. A twin tee notch filter 287 traps out any of the interrogate carrier frequency which gets into this part of the circuit. The signal is then fed to twin receivers, each tuned to one of the reply frequencies, where the presence or absence of the reply frequency is detected to produce an output logic signal for the "RED" and "GREEN" inputs to the interface circuitry (FIG. 14). If the multi-channel, multi-reply frequency approach of FIG. 1 is employed, additional receivers are provided, each tuned to a different reply frequency.

The memory unit is illustrated in detail in FIG. 17. Two identical memory arrays are used, one each for the RED and GREEN memories. Only the GREEN memory is illustrated in detail in FIG. 17. Each array includes 20 16-bit active memory elements 290, (for example, of Texas Instrument Model SN7481). An element of any of these memories is addressed in matrix fashion by raising one X input and one Y input to a logical "1." The elements are arranged in five columns and four rows.

The $Y_A$, $Y_B$, $Y_C$ and $Y_D$ inputs from the interface circuitry (FIG. 14) provide BCD information to multiplexer 291 (for example, Texas Instrument Model SN74151), which produces a "0" in sequence on the number 15, 14, 13 . . . . . . 0 outputs as the $Y_A$, $Y_B$, $Y_C$, $Y_D$ inputs take on their sequential values due to the action of the READ or WRITE scaler. The Y15, Y14, Y13 and Y12 outputs correspond to the Y inputs to each of the memory elements 290 in the bottom row, the Y11, Y10, Y9 and Y8 outputs are inputs to each one in the row second from bottom, etc. The $X_A$, $X_B$, $X_C$ and $X_D$ inputs from FIG. 14 are inputs to a similar multiplexer 292 which produces the same effect on the X inputs to the memory elements 290 in the first four columns. When $X_E$ goes to "0" (after $X_A$, $X_B$, $X_C$, $X_D$ have taken on all values to gate all 16 outputs of multiplexer 292), the inverter from the $X_E$ input to the strobe input of multiplexer 292 provides a positive internal signal which holds all outputs X0–X15 positive. This prevents addressing of any memory element in the first four columns while a further multiplexer 293 addresses those in the last column. During the first 16 addresses, $X_E$ is positive and its input to the strobe of multiplexer 293 prevents addressing of the last column.

A "1" is written into an element of the GREEN memory, when it is addressed, by applying a logical "1" signal at the common $G_{w1}$ input, and it is erased by applying a logical "1" signal at the common $G_{w0}$ input (and similarly for the RED memory). When a memory element is addressed for readout, the common $G_{s0}$ (or $R_{s0}$) output drops from a "1" to a "0" if the element contains a "0," and the common $G_{s1}$ (or $R_{s1}$) output drops from a "1" to a "0" if the element contains a "1."

Therefore, as each corresponding element of the two memories is addressed for readout by the READ scaler (FIG. 14), the $G_{S1}$ output, which goes to the color generator (FIG. 6), drops if there is a "1" in the green memory element being addressed. Similarly, the $R_{S1}$ signal to FIG. 6 drops if there is a "1" in the corresponding RED memory element. The circuitry illustrated for the GREEN memory is identical for the RED memory and need not be described in detail.

Figure 18:
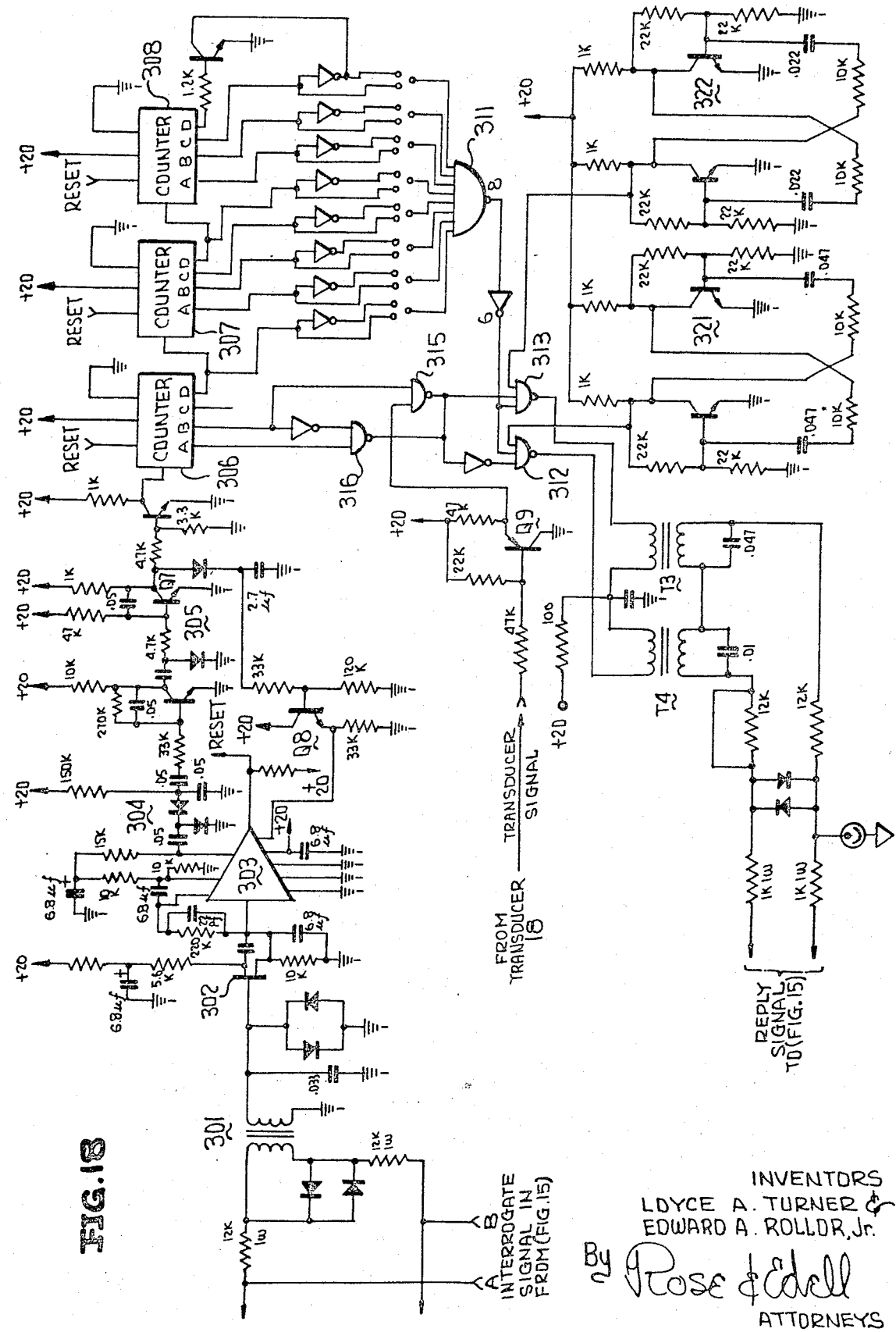

A typical transponder is illustrated in detail in FIG. 18. The interrogate signal carrier frequency (3,000 Hz) modulated at 60 Hz is received by a tuned transformer 301 and fed to an FET amplifier stage, which drives an operational amplifier 303. A pair of diodes at the output of amplifier 303 serve as an evelope detector 304 which extracts the modulation. The following transistor circuit 305 acts as an amplifier and limiter, the output of which is a fixed amplitude square wave (approximately). Three counters 306, 307, 308 (for example, Texas Instrument Model SN7493) form a 12-bit scaler which counts positive half cycles of the square wave. The second transistor Q7 in the amplifier-limiter has a diode 309 and capacitor 310 between the collector and ground. Capacitor 310 is normally charged when interrogate pulses are being received. During the period between pulse trains, capacitor 310 has time to discharge sufficiently to turn off emitter follower Q8. The emitter follower output drives an inverter (part of operational amplifier circuit 303). The output of the inverter delivers the reset signals to the 12 bit scaler.

The D output of counter 306 and the A, B, C, D, outputs of counters 307, 308 lead to terminals which can be jumper wired to the imputs of an eight-input NAND gate 311. They are also connected through inverters to alternative terminals. By selection of the terminal (inverted or non-inverted output) to be jumpered for each scaler output, the eight addresses to which that transponder will reply can be selected. The jumper selections cause the eight input NAND gate to have a negative output for a selected eight consecutive interrogate pulses, which correspond to the following combinations of the A, B outputs of counter 306.

TABLE XI

| A | B |
|---|---|
| 0 | 0 |
| 1 | 0 |
| 0 | 1 |
| 1 | 1 |
| 0 | 0 |
| 1 | 0 |
| 0 | 1 |
| 1 | 1 |

The output of NAND gate 311 is inverted and fed to two NAND gates 312, 313 which select the reply frequency to be transmitted.

The A, B outputs from counter 306 are fed to two NAND gates 315 and 316 and the inverted B output is fed to NAND gate 316. NAND gates 315 and 316 act as decoders for the addresses assigned to the transponder. Their outputs control the two frequency selecting NAND gates 312, 313. The tranducer signal is an input from a transducer 18 which indicates by logic level the condition of the monitored function. For a typical transducer circuit, reference is made to FIG. 21, described in detail below. The transducer signal is normally at ground (no alarm). An alarm condition causes the signal to go high, cutting off transistor Q9 and producing a "1" at the input of NAND gate 315. The correlation between the A, B output signals of counter 306, the outputs of the NAND gates 315, 316, and the outputs of NAND gates 312, 313 is given by the following table:

TABLE XII

| Address Number | Counter 306 outputs A B | Outputs of group of NAND gates 315 316 | Inputs to pair Of NAND gates 312 313 |
|---|---|---|---|
| 0 & 4 | 0  0 | 1        1 | 0        1 |
| 1 & 5 | 1  0 | 1        0 | 1        0 |
| 2 & 6 | 0  1 | Alarm 0  1<br>No.<br>Alarm 1 | Alarm 1  Alarm 0<br>No.       No.<br>Alarm 0  Alarm 1 |
| 3 & 7 | 1  1 | Alarm 0  1<br>No.<br>Alarm 1 | Alarm 1  Alarm 0<br>No.       No.<br>Alarm 0  Alarm 1 |

In the lower right corner of FIG. 18 there are two continuously running oscillators 321, 322 which generate the carriers for the reply signals. Oscillator 321 generates the low frequency reply carrier (1.31 KHz), and the one on the right generates the high frequency reply carrier (2.1 KHz). The reply carriers are gated by NAND gates 312, 313, respectively, when the transponder is being addressed, and when the NAND gate receives a logic "1" input according to the table above. When the scaler count corresponds to zero and fourth addresses, NAND gate 313 passes the 2.1 KHz frequency to its transformer T3. Similarly, the number 1 and 5 addresses gate the 1.31 KHz frequency through NAND gate 312 to the other transformer T4. The secondary of the activated transformer delivers the selected frequency to the wire pair for return to the central station. Note that for addresses number 2 and 6 the 1.31 KHz frequency is selected in the event of alarm, and the 2.1 KHz frequency is selected if there is no alarm.

The transponder of FIG. 18, operating in the system of FIG. 1, may be modified to detect multiple alarm functions for each subscriber while using only one pair of conductors from the transponder to that subscriber's station. Assume that only burglary, fire and panic button services are to be provided to subscribers' homes, so that the cost of a subtransponder in each home is not justified. In order to avoid dual cable between the transponder and each home, a means is needed to provide the transponder with the binary input data for two functions from one pair of conductors into the home. This is achieved by applying 1 cycle of an a.c. or square wave voltage to the housedrop cable at the transponder. The alarm device control unit in the home is designed to permit current to flow during both positive and negative halves of this applied voltage cycle if there is no alarm (normal condition). If a fire alarm occurs, current is blocked by the control unit during the positive phase only, for example; if there is a burglar alarm, current is blocked during the negative half of the cycle. If the panic button is activated, no current flows during either half of the cycle. This last effect results also if a burglar cuts the cable between the transponder and the house. Should a burglar short circuit the cable, current flows during both phases, but is much greater than normal, and this effect is detected by the transponder and interpreted as a panic button alarm.

FIG. 18a shows one embodiment of a means which achieves this result. The circuitry which must be added to the transponder to provide this feature is shown in a dashed block 323. This includes a plurality of identical strobing circuits 324, one for each subscriber, and a common output circuit. Strobing circuits 324 include an NPN transistor Q1 (Q2 for subscriber 2, Q3 for subscriber 3, etc.) connected in common emitter configuration with its emitter tied to ground and its base tied to an output (depending upon the subscriber address) of the interrogate pulse counter decoder in FIG. 18. The collector of Q1 is connected to a junction B which is tied through a resistor $R_{B1}$ to +5 volts d.c. Junction B is also connected to the anode of a diode $D_1$ ($D_2$ for subscriber 2, etc.) and to a junction A via resistor $R_{B2}$. Junction A, in turn, receives a square wave generated at the output of the first stage of counter 306 in FIG. 18. This square wave makes one complete cycle (positive and negative phases) during the time in which two interrogate pulses are received by the transponder. Junction A is also tied to the housedrop cable for the subscriber serviced by the particular strobing circuit 324.

The common additional circuitry in block 323 of the transponder includes five transistors $Q_A$, $Q_B$, $Q_C$, $Q_D$ and $Q_E$. Transistor $Q_B$ is arranged to sense the condition of the addressed strobing circuit 324 and has its base connected to the cathodes of each of diodes $D_1$, $D_2$, $D_3$, etc. The collector of $Q_B$ is grounded and the emitter is connected to a junction C which serves as the input junction to a level detector formed by $Q_C$ and $Q_D$. The latter are opposite type transistors connected in push-pull relation with their bases connected to junction C and their emitters connected together at junction D. The collector of $Q_D$ is connected to the base of output transistor $Q_A$ along with the collector of $Q_E$, the latter serving as an inverter for the signal at the collector of $Q_D$. $Q_A$ is an NPN transistor having a grounded emitter and a collector which is resistively coupled to +5 volts D.C. If a positive voltage is applied to the base of $Q_A$ it provides a grounded output signal; ground or negative voltage at the base of $Q_A$ cuts off the transistor and provides a +5 volts D.C. output signal.

At each subscriber's station, the ungrounded conductor in the housedrop cable is selectively opened and closed by means of the series connected panic button. The other side of the panic button is returned to ground via two parallel alarm sensing circuits. A first circuit includes diode 325, a fire detection switch and resistor $R_{A2}$; the second circuit includes diode 326, a burglary detection switch and resistor $R_{A3}$. Diodes 325 and 326 are oppositely poled, relative to ground, so that each may be rendered conductive during a different phase of the square wave at junction A. The fire and burglary detection switches are merely schematic representations of a device which provides open and closed circuit conditions in accordance with the alarm condition being detected. It is assumed for present purposes that the switches are normally closed, and that they open automatically if there is a fire or a burglary.

The output of the first stage of the interrogate pulse counter 306 (FIG. 18) is a 5 volt square wave, which makes exactly one complete cycle during the time in which two interrogate pulses are received by the transponder and, therefore, two sequential functions are queried during this time by the decoder. During each half of the cycle, a voltage appears at the collector of $Q_A$, this voltage being either 5 volts or zero volts. This output controls the reply frequency sent out by the transponder. One complete cycle of the square wave corresponds to two functions in the same home. The resulting outputs under varying conditions are:

|  | positive half cycle | negative half cycle |
|---|---|---|
| Normal | +5 volts | +5 volts |
| Fire only | 0 | +5 |
| Burglar only | +5 | 0 |
| Panic button | 0 | 0 |
| House drop open | 0 | 0 |
| House drop shorted | 0 | 0 |

The square wave is fed to junction A in each strobing circuit via resistors $R_{A1}$ (value, 1 K, for example). The first two interrogate pulses cause the decoder to apply a negative voltage to the base of $Q_1$ isolating junction B from ground; $Q_2$, $Q_3$, etc. remain clamped to ground until each is gated in turn. Resistors $R_{B1}$, $R_{B2}$ and $R_{A1}$ in the first section of the transponder, along with the resistors $R_{A2}$ and $R_{A3}$ in the first house, form a voltage dividing network which determines what voltage will be applied thru diode $D_1$ to the base of $Q_B$. During the first half (positive phase) of the square wave, the voltage $V_A$ at junction A can have any one of three values, and the voltage $V_B$ at B will have a value midway between $V_A$ and the +5 volts of B+, depending on the status of the three normally closed pairs of contacts in house No. 1, and on whether the housedrop cable has been cut or shorted (by a burglar, for example), as indicated in Table XIII.

TABLE XIII

| Condition | $V_A$ | $V_B$ |
|---|---|---|
| Normal | +2 ½ volts | +3 ¾ volts |
| Burglar only | +2 ½ | +3 ¾ |
| Fire only | +5 | +5 |
| Fire and burglar | +5 | +5 |
| Panic Button | +5 | +5 |
| House drop cut | +5 | +5 |
| House drop shorted | 0 | +2 ½ |

During the negative half of the square wave, the voltage at point (B) will be as indicated in Table XIV.

TABLE XIV

| Condition | $V_A$ | $V_B$ |
|---|---|---|
| Normal | −2 ½ volts | +1 ¼ volts |
| Burglar only | −5 | 0 |
| Fire only | −2 ½ | +1 ¼ |
| Burglar and fire | −5 | 0 |
| Panic button | −5 | 0 |
| House drop cut | −5 | 0 |
| House drop shorted | 0 | +2 ½ |

The positive half of the applied square wave occurs during the interrogation for fire in house number 1. The negative half occurs during the interrogation for burglary. The positive voltage produced at B is passed by diode $D_1$ to the base of $Q_B$. The emitter of $Q_B$ follows the base and transfers this volage to C. During the negative half cycle, current thru $R_J$ provides the transfer of $V_B$ to the base of $Q_B$. This path is blocked by diode $D_A$ during the positive half cycle.

Junction D, at the output of the level detector, is held at +3 ¾ volts during the positive half cycle, and at +1 ¼ volts during the negative half. This is achieved by selecting proper values for $R_D$, $R_E$ and $R_F$, for example: $R_D = 1K$, $R_E = 2K$ and $R_F = 2K$. During the positive half cycle, the resistor network holds D at +3.75 volts. During the negative half cycle, the network reduces the voltage at D to +1 ¼ volts. Therefore, during the positive half cycle, the voltages at C and D are the same only if conditions are normal for the functions being interrogated. Similarly, during the negative half cycle, these voltages are the same only if the functions interrogated on that half cycle are in the normal (no alarm) state.

As long as the voltages at points C and D are close to the same value (within about 0.6 volts), neither $Q_C$ nor $Q_D$ conducts. Therefore, $Q_A$ does not conduct, and the output is at B+, or +5 volts. In any abnormal condition, the difference between the voltages at C and D is approximately 1 ¼ volts, which causes either $Q_C$ or $Q_D$ to conduct. If $Q_C$ conducts, the current thru $R_I$ biases $Q_E$ to conduct, and the resulting current thru $R_H$ turns on $Q_A$, grounding the output. If $Q_D$ conducts, it draws current thru $R_H$ causing the same effect.

The advantages of this circuit include its low cost, due to sharing of one level detector for any number of inputs in a time multiplexed system. Also only one gate (diode and transistor) is required for each two inputs.

Reference is made to FIGS. 19 and 20, which show one dial of a typical utility meter having a calibrated meter face 331, a pointer 332 secured to a shaft 334, which rotates relative to the face at angular velocity proportional to the time rate of consumption of power (or other commodity).

A standard meter of this type is readily modified by securing a permanent magnet 335 to the non-rotating meter face or housing, within the confines of the periphery of the calibrated dial. A high permeability shield 336 in the form (roughly) of a semicircle is secured to the rotating shaft 334. A magnetic reed switch 337 is mounted to a non-rotating part of the meter housing, in alignment with magnet 335 and adjacent to the shield 336, but at the opposite side of the shield from the magnet.

With the aforedescribed arrangement, reed switch 337 is open whenever shield 336 is aligned with and between magnet 335 and the switch. The switch closes when shield 336 moves out of alignment. Consequently, since the shiled is semicircular in shape, switch 337 is open for half of each revolution of the pointer and closed for the other half of each pointer revolution.

This arrangement can be applied to any standard meter as an attachment which fastens to or on the rotating shaft 334, or it may be built into and form an integral part of the meter.

If the meter arrangement of FIGS. 19, 20 were employed with a transponder of the type illustrated in FIG. 18, opening and closing of the switch could be easily sensed. If samplings of the transponder are sufficiently frequent to prevent the disk from rotating more than one-half cycle between samplings, the changes in state of switch 337 can be sensed as increments of consumed power or other commodity. The logic, all at the central station, for sensing changes in the switch can then update the total of consumed power measured by the meter.

Importantly, only one of the meter dials need be coded, and a single binary level is all that need be transmitted. There is no need for complex decoders at the transducer nor is it necessary to transmit multiple serial or parallel binary signals for each sample.

As an illustrative example of the advantages of this approach, consider a watt-hour meter in a house fused for 500 amps at 220 volts. The absolute minimum time for the first indicator to make a complete revolution would be about:

(10KWh/revolution/110 kW) = about 0.1 hour per revolution or 3 minutes per half revolution.

The maximum sustained level of power for a 3 minute period would be considerably less, and a 3 minute interrogation cycle for the least significant dial should be conservative. If it is desired to measure to the nearest 5 kWh, one can code the first indicator to provide a "0" on one-half revolution and interrogate at regular intervals sufficiently short to insure that no first dial indicator can possibly rotate as far as 180° during an interval. At locations where the consumption rate is higher, the encoder can be placed on the second, third, etc. dial to avoid increasing the interrogation rate. With the encoder on the second ("10" position) indicator, the maximum cumulative error due to rounding off in this manner would be 50 kWh or about 20 cents worth of power, and of course it is picked up on the next month's billing. The present manual method is much worse than this because not only the time of day, but day of the month on which the man arrives to read the meter can vary. The advantage of a long time interval between successive interrogations of a meter is simply the requirement for less bandwidth to handle a given number of meters.

One advantage of encoding the first indicator and using a fast interrogation rate would be the additional accuracy where consumption rate is high. Another would be to get "demand" records to anticipate the need for additional capacity in the power distribution system. For example, the cumulative readings for all meters on the same transformer can be extracted from the central memory at the end of each group of N sequential interrogate pulses and summed. The difference in the sums at the beginning and end of each period, divided by NT, where T is the time between successive interrogations, gives the load on the transformer that time interval. A plot of load vs. time will show peak demand and time of occurrence. In fact the indicator can be encoded to tenths of a revolution or any other fraction instead of half revolutions, if shorter term fluctuations need to be studied. The main disadvantages are the large bandwidth used up and the cost of additional memory capacity. The method described for determining transformer load can be used to determine flow rates in large gas or water pipes by combining consumption rates of all meters downstream from the point of interest.

One disadvantage of the meter reading technique described above is that, if power is ever lost at the transponder, or if there is a malfunction or cable break, the consumption of power, water or gas during the down period is not registered, and the only obvious way to correct for this is to send a man out to visually read the meters. This is due to the fact that there is no high capacity memory at the meter, which of course is the primary advantage of the aforementioned system. There is a way to correct for this, however. FIG. 22 shows two encoders 350, 351 mounted on a four-dial meter, one on the least significant dial 352 and one on the third least significant dial 353, for example.

Encoder 350 changes state upon consumption of five units of power; encoder 351 state tate upon consumption of 500 units of power. Two transponder functions are assigned to the meter, one for each encoder. The continuity of the path between connections B and C tells the state of the encoder 350; connectons A and B are monitored by the other function to determine the state of the encoder 351. When the computer at the central station accepts the reply data from functions 1 and 2, it sees the following 2-digit binary numbers:

00, 01, 00, 01, 00 . . . . . . . . 01, 10, 11, 10 . . . .
|←——— 100 half revolutions of shield 336 ———→|

If the maximum consumption rate is such that the first encoder cannot change states in less than 3 minutes, then the second encoder cannot change states in less than 100 × 3/60 = 3 ⅓ hours. Consider a mass failure in the cable communication system in which the readings are lost from hundreds or even thousands of meters during a down time of several hours. Assuming the trouble is corrected within 3 ⅓ hours, the central computer can correct the stored readings of the affected meters. For example, if function No. 2 is in the same binary state when service is restored that it was in before the failure, then the next time it changes state the computer adds sufficient counts to the memory for that meter to make the last two base 10 digits become zero. If function No. 2 has changed states during the down time, then when it changes again the computer will add sufficient counts to bring the last two base 10 digits to zero and also add 100 counts. Thus, the stored meter data are corrected without the need to send a man out to all of the affected homes to visually record the readings. If function No. 2 is assigned to the fourth least significant dial, a down time of 33 hours can be tolerated without loss of information.

A simple transducer circuit for use with the meter arrangement of FIG. 19 is illustrated in FIG. 21. The transponder applies a signal to terminal 340 which is coupled to ground by a pair of series resistors 341, 342. A switch 343, for example, representing switch 337 in FIG. 19, is connected in parallel with resistor 342 and an output signal is taken across the switch.

When switch 343 is open, a level detector in the transponder produces a logical "1" due to the series effect of resistors 341 and 342 in the circuit. When the switch is closed, the effect of resistor 341 along produces a logical "0." The level detector can be made to sense a resistance much lower than 341 (as in the case of a short in the line between transponder and transducer) or a resistance much higher than 341 and 342 (open circuit). This condition can be made known at the central station by transmitting both (or neither) reply pulses.

The circuit of FIG. 21 may be readily employed to provide a transducer signal for the transponder of FIG. 18. Switch 343 can represent a meter reading, an alarm condition, or any parameter which can be represented by opening or closing of a switch.

FIG. 23 illustrates in block diagram form a circuit which can be employed at a central station in a telemetering system which performs remote meter reading in the manner described above. Specifically, assume that a transponder, to which the meter reading function is assigned, replies with an $f_3$ pulse when the reed switch is closed and an $f_4$ pulse when the reed switch is open. The receiver includes appropriate bandpass filters 361 and 362 for $f_3$ and $f_4$, respectively. Detectors and pulse shapers (not illustrated) may also be provided for each filter. When an $f_3$ pulse is present a flip-flop 363 is set; when an $f_4$ pulse is present the flip-flop is reset. The state of flip-flop 363 is monitored by a comparator which also receives from the memory unit 16 the prior state of reed switch being sampled. This prior state may be stored in a memory such as that illustrated in FIG. 17 and gated therefrom at the appropriate time by multiplexing circuitry such as that illustrated in FIG. 14. The gated prior switch state is fed to flip-flop from which it is applied to comparator 364. When the states of flip-flops 363 and 365 differ, a pulse is sent to the computer to increment the count by one unit for the meter currently being sampled.

With some slight modification, the system described in relation to FIG. 1 may be employed to retrieve pay TV billing information. Specifically the basic telemetry system operates by interrogating every function in the field at regular intervals of time, which may be as short as several seconds or less. A pay TV system usually includes a small box on top of the set with a lock requiring a key to permit the viewer to watch special channels, the subscriber being billed by the minute or by the program. The lock prevents accidental large bills caused by children, for example. Referring to FIG. 24, one function of a subtransponder 381 may interrogate this box 382 continually to simply ascertain whether the key is turned on, i.e., whether the subscriber should be billed. Another five functions of the subtransponder may be assigned to a 32 (for example) channel selector position encoder 383 to ascertain which of 32 pay TV channels is being viewed. FIG. 24 illustrates a concept for processing the information received at a central station. The central station includes the usual scanning circuitry 371 and memory 372 which retains all information obtained on each function when it is interrogated until replaced by updated information on the next scan. A programmed rate schedule 373 is driven by a clock 374 to indicate in real time what the rate in cents per minute, for example, is for each of the 32 channels. The rate may vary with time on each individual channel according to the program material. As each subscriber set is interrogated for ON/OFF status of the pay TV channel selector on that set, the information from the rate selector 374 is gated by gate 376 to a temporary memory section for the customer who is to be billed for that TV receiver. The information provided by the rate selector may be in units of pennies, for example. If the interrogate cycle takes six seconds, then the on/off question is asked every 1/10 of a minute. As the question is answered by a particular TV receiver, the channel selection information in the scanning circuit memory is fed to rate selector 374, which extracts the rate from the rate schedule 323 and feeds it to gate 326. If the rate for that channel at that instant is 5 cents per minute and the basic accounting unit is a 1/10 of a cent, then 5 units are added to the accumulated count in the memory section for that TV receiver. The information in this memory is batched to a computer, periodically, for addition to a permanent memory.

It should be mentioned that the numerous aspects of this invention are disclosed in their preferred form only and that different embodiments of the inventive concepts disclosed herein are possible. For example, the color TV display is disclosed in a form where grid squares are colored entirely according to monitored function conditions. It is of course within the scope of this invention to only partially color a grid square, or to color characters associated with the grid square. In the latter case, the permanent column and row labels may be dispensed with, and an actual number assigned to the grid square may be "printed" in a color representing the monitored function condition. With such a numbering arranged it would also be possible to eliminate the grid lines entirely and merely color permanently displayed number in accordance with monitored status. It is also possible within the scope of this invention to utilize a black and white television display wherein different shadings or stripe patterns signify respective states of a monitored parameter.

While we have described and illustrated specific embodiments of our invention, it will be clear that variations of the details of construction which are specifically illustrated and described may be resorted to without departing from the true spirit and scope of the invention as defined in the appended claims.

What is claimed is:

1. A telemetering system for monitoring multiple remote functions having at least first and second alternate states, said system comprising:

a central station including a transmitter and a receiver, said transmitter including means for generating a series of interrogate pulses, each interrogate pulse comprising signal oscillations at an interrogate frequency, wherein each of said functions have a number pre-assigned thereto, said number corresponding to one or more pulses in said series of interrogate pulses;

a transmission medium for transmitting said interrogate pulses to a plurality of remote locations;

a plurality of transponders, at least one transponder located at each of said remote locations, each transponder including:

means for receiving said series of interrogate pulses from said transmission medium;

a counter for counting received interrogate pulses;

sensing means for sensing the state of at least one of said functions, wherein said at least one function is different for each transponder;

a decoder for providing an actuation pulse when the count in said counter is the number pre-assigned to said one function;

a first oscillator for generating a first oscillatory signal at a first reply frequency;

a second oscillator for generating a second oscillatory signal at a second reply frequency;

first gating means responsive to coincidence of said actuation pulse and said one function in its first state for transmitting a reply pulse of said first oscillatory signal to said receiver via said transmission medium;

second gating means responsive to time coincidence of said actuation pulse and said one function in its second state for transmitting a reply pulse of said second oscillatory signal to said receiver via said transmission medium;

wherein at least a first and second of said functions are pre-assigned the same number, and wherein said first and second reply frequencies at a first transponder which senses said first function differ from the first and second reply frequencies at a second transponder which senses said second function; whereby said first and second transponders transmit simultaneous reply pulses of different reply frequencies in response to the interrogate pulse corresponding to said same pre-assigned number; and wherein said receiver includes a plurality of circuit means, each individually tuned to a different one of said reply frequencies.

2. A telemetering system for monitoring the states of multiple remote functions having at least two alternate states, said system comprising:

a central station including a transmitter, a receiver, and means for processing received signals, said transmitter including means for generating a first sequence of interrogate pulses, each interrogate pulse comprising oscillations at a first interrogation frequency;

a plurality of remote parallel-connected channels, each channel including a plurality of parallel-connected transponders for receiving said interrogate pulses of said first interrogation frequency and generating reply pulses;

a transmission medium for transmitting said interrogation pulses to all of said channels and transponders and for transmitting said reply pulses to said receiver.

wherein each transponder is pre-assigned one or more addresses corresponding to respective ones of said interrogate pulses in said sequence, all pre-assigned addresses in any one channel being different but pre-assigned addresses in different channels being the same;

wherein each transponder includes:

sensing means for sensing the state of one or more of said functions, each of said one or more functions being pre-assigned a different number corresponding to an address assigned to said transponder;

a counter for counting said interrogate pulses;

a first oscillator for generating a signal at a first reply frequency, said first reply frequency being the same for all transponders in the same channel but differing between transponders in different channels;

a second oscillator for generating a signal at a second reply frequency, said second reply frequency being the same for all transponders in the same channel but differing between transponders in different channels;

decoding means responsive to the count in said counter being equal to one of said pre-assigned numbers for: generating a reply pulse of said first reply frequency if the function having said pre-assigned number is in its first state, and for generating a reply pulse of said second reply frequency if the function having said pre-assigned number is in its second state;

whereby simultaneous reply pulses of different reply frequencies are transmitted to said receiver from different channels; and wherein said receiver includes: a plurality of circuit means, each individually tuned to a different reply frequency.

3. The system according to claim 2 wherein said transmission medium consists of a coaxial cable dedicated solely to said telemetering system.

4. The system according to claim 3 wherein said coaxial cable is devoid of active devices between said central station and said transponders.

5. The system according to claim 2 further comprising a display for said functions, said display comprising: a color cathode ray tube having a continuous grid-pattern image on its screen, each grid location corresponding to a respective one of said functions, processing means responsive to received reply pulses for storing a signal representative of the state of each of said functions; and means responsive to said stored signals for displaying in each grid location a color representative of the state of the function corresponding to that grid location.

6. The system according to claim 5 wherein said displayed grid pattern is bordered by a horizontal row containing number labels identifying each vertical grid column, said grid pattern also being bordered by a vertical row containing number labels identifying each horizontal grid row, said number labels being displayed by circuit means comprising means for blanking the cathode ray beam of said television receiver in predetermined areas to form individual blanked elements of said number labels.

7. The system according to claim 2 wherein at least one of said functions is a meter reading, wherein said meter includes a plurality of rotating shafts with pointers and calibrated dials which register different units of the total of a consumed quantity, and wherein the transponder sensing means for said meter reading includes:

a semi-circular magnetic shield secured to one of the shafts;

a permanent magnet mounted adjacent one side of the magnetic shield; and a magnetic reed switch mounted adjacent the side of the magnetic shield opposite said one side and in alignment with said permanent magnet such that said shield subsists between said magnet and said switch for half of each revolution of said one shaft member, whereby said switch assumes open and closed states in accordance with the current half cycle of said one shaft member.

8. The system according to claim 7 further comprising:

counter means at said central station for registering the total of said consumed quantity; and means responsive to each change in status of said reed switch, as identified by a change in the reply frequency for the meter reading, for updating said total at said counter means.

9. The system according to claim 2 further comprising:

means at said central station for generating a second sequence of interrogate pulses at a different repetition rate than said first sequence, each of said second sequence of interrogate pulses comprising pulsed oscillations at a second interrogation frequency; and a further plurality of said transponders, each arranged to receive interrogate pulses of said second sequence and transmit reply pulses of third and fourth frequency signals back to said central station;

wherein said first and second sequences of interrogation pulses and all of said reply pulses are transmitted over a common transmission path in said transmission medium.

10. The system according to claim 2 wherein said transmission medium is a coaxial cable configured in a loop having two ends located at said central station, and wherein said central station includes means for transmitting interrogate pulses alternately in opposite directions along said cable.

11. The system according to claim 2 wherein said transmission medium is a coaxial cable configured in a loop having both ends located at said central station, and wherein said central station includes means for transmitting an entire sequence of said interrogate pulses in one direction along said cable and then transmitting a like sequence of said interrogate pulses in an opposite direction along said cable.

12. The system according to claim 2 wherein at least one transponder includes a sensing means for measuring an analog parameter, said transponder further including:
analog-to-digital converter means for converting the analog measurement to an N-bit binary number; and
means for transmitting N reply pulses in response to N successive interrogate pulses in said first sequence, each of said N reply pulses having said first reply frequency when a corresponding one of said N-bits in said binary number is binary one and having said second reply frequency when said corresponding bit is binary zero.

13. The system according to claim 2 wherein said central station includes means for generating and transmitting to said transponders additional pulses, each additional pulse comprising a pulsed oscillation of a frequency other than said interrogation frequency, said additional pulses representing data to be transmitted to said transducers, wherein at least some of said transponders include means responsive to received pulses of said other frequency for effecting a specified operation.

14. The system according to claim 2 wherein some of said sensing means associated with at least some of said transponders includes means for sensing three different bistable functions, and wherein each said sensing means and its transponder are interconnected only by a single pair of conductors.

15. The system according to claim 14 wherein said sensing means includes a first two-position switch means connected in series with a first diode between a common junction and a first of said conductors, a second two-position switch means connected in series with a second diode between said common junction and said first conductor; and a third two position switch means connected in series between said common junction and the second of said pair of conductors, wherein said first and second diodes are oppositely poled relative to said common junction; and wherein said transponder includes means for applying at least one cycle of a two phase alternating wave to said second conductor, and means for detecting conduction of each phase of said alternating wave between conductors through said sensing means.

16. The system according to claim 2 utilized for retrieving pay TV billing information, wherein pay TV subscribers are provided with an on-off sensor indicating use and non-use respectively of pay TV channels by the subscriber, and a channel selection encoder indicating which pay TV channel is being used, said system comprising:
means at said transponder for detecting the conditions of said on-off sensor and encoder; and
means at said central station for assigning specified interrogation pulses to the functions of monitoring the use and used channel of each pay TV station.

17. The system according to claim 10 wherein $N + 1$ interrogation pulses are utilized to monitor the on-off status and used channel for a pay TV subscriber having the choice of $2^N$ possible channels.

18. The method of inceasing the monitoring capacity of a telemetering system comprisng the steps of:
transmitting a sequence of interrogate pulses from a central station to each of a plurality of remote locations:
counting said interrogate pulses at each of said remote locations;
sensing the state of at least one different monitored parameter at each remote location;
transmitting a reply pulse from each remote location to said central station when the interrogate pulse count corresponds to a number pre-assigned to a monitored parameter being sensed at that location, said reply pulse having a first reply frequency if the monitored parameter is in a first state and second reply frequency if the monitored parameter is in a second state, wherein at least one transponder has a first reply frequency which differs from the first reply frequency of a second transponder, said one transponder also having a second reply frequency which differs from that of the second transponder, and wherein said one and said second transponders sense monitored parameters having the same pre-assigned number.

19. The system according to claim 13 wherein each additional pulse is time-coincident with an interrogate pulse in said first sequence corresponding to the address of the transducer to which data is being transmitted.

20. A system for simultaneously displaying the state of multiple monitored parameters, said system comprisng a color cathode ray tube includng sweeping electron beams, a display screen, means for blanking or controlling the intensities of said beams to effect blank or colored horizontal and vertical lines on said screen, said lines forming a grid pattern therebetween wherein each grid location represents a different monitored parameter, means for storing the state of each monitored parameter in response to data signals received therefrom, and means for illuminating each of said grid locations with a color indicating the stored state of the monitored parameter represented by that grid location.

21. The system according to claim 20 further comprisng character generator means for blanking or controlling the intensities of said beams to effect blank or colored elements of characters extending along two sides of said grid pattern in position to label the rows and columns of said grid pattern.

22. The system according to claim 20 wherein each of said parameters has two operating states and one non-operating state, each state being represented by a different color illuminating the corresponding grid location on said display screen.

23. A commodity consumption meter adapted to be remotely located from a central monitoring station and to transmit a binary coded measurement pulse to said central station at regular monitoring intervals, said meter comprisng:
- a plurality of cyclic meter elements, each arranged to measure the same consumed commodity but having different units of measure such that each element completes a cycle in response to consumption of a different unit of said commodity;
- first switching means responsive to successive completions of a predetermined part of a cycle by one of said meter elements for alternating between first and second stable states, said one meter element having a relatively small unit of measure;
- means for transmitting said binary-coded measurement pulse to said central station during each monitoring interval, said binary-coded pulse having a binary value determined by the state of said first switching means at the time of transmission, wherein the frequency of transmission of said binary coded pulse is sufficiently high to prevent said one meter element from completing said predetermined part of its cycle during maximum consumption rate for said commodity; and
- additional means for preventing loss of consumption measurement accuracy in the event that system failure prevents transmission of said binary-coded measurement pulse to said central station for up to a predetermined period of time, said additional means comprising:
  - second switching means responsive to successive completions of a predetermined part of a cycle by a second of said meter elements for alternating between first and second stable states, said second meter element having a larger unit of measure than said first meter element;
  - means for transmitting a further binary-coded pulse to said central station during said monitoring interval, said further binary-coded pulse having a binary value determined by the state of said second switching means at the time of transmission, wherein said predetermined part of the second meter cycle is such that for maximum rate of commodity consumption said second meter element cannot complete said predetermined part of its cycle in said predetermined period of time.

24. The combination according to claim 23 wherein said predetermined part of the cycles of said first and second meter elements is one-half cycle.

25. A telemetering system for remotely monitoring the consumption of a commodity comprising:
- a transmitter located at a central station for generating an interrogation pulse sequence including at least one pulse identifying a predetermined remote location at which said commodity is being consumed;
- a transmission medium for transmitting said pulse sequence to a plurality of locations including said predetermined remote location;
- means located at said predetermined remote location for recognizing said identifying pulse; and
- switchable means located at said remote location and having first and second stable states;
- means responsive to consumption of said commodity for alternately switching said switchable means between said stable states as a predetermined amount of said commodity is consumed;
- reply means for transmitting a reply signal via said transmission medium to said central station upon recognition of said identifying signal, said reply means including means for imparting a first identifying characteristic to said reply signal if said switchable means is in said first stable state; and means for imparting a second identifying characteristic to said reply signal if said switchable means is in said second stable state.

26. The system according to claim 25 wherein said tramsitter includes means for repeating said identifying pulse at sufficiently frequent intervals relative to the maximum rate at which said quantity can be consumed to prevent the amount of said commodity consumed between identifying pulses from exceeding said predetermined amount.

27. The system according to claim 26 wherein said reply pulse is pulse of oscillatory energy, and wherein said first and second identifying characteristics are respective first and second frequencies of said oscillatory energy.

28. The system according to claim 25 wherein said consumed commodity is measured at said remote location with a meter comprising a plurality of rotating shafts, each shaft representing a different unit of the consumed quantity, and wherein said predetermined amount of said consumed quantity corresponds to one-half rotation of one of said shafts.

29. The system according to claim 28 including: a permanent magnet and a magnetically operated switch mounted in alignment adjacent opposite faces of a semi-circular magnetic shield secured to one of said shafts for blocking magnetic flux lines between said permanent magnet and said switch for one-half of each rotation period of said one disk.

30. The system according to claim 26 arranged to maintain accurate monitoring of consumption of said commodity during a system failure of the type in which reply signal transmission to said central station is prevented for up to a predetermined period of time, said system further comprising:
- further switchable means having first and second stable states;
- means responsive to successive rotations of a second shaft through one half a rotation cycle for alternately switching the states of said further switchable means, wherein said second shaft rotates at a slower speed than said first shaft and, for the maximum rate of commodity consumption is arranged to rotate through one-half cycle during said predetermined period of time;
- means responsive to another pulse in said interrogation pulse sequence for activating said reply means to transmit said reply signal to said central station with an identifying characteristic determined by the state of said further switchable means.

31. The method of monitoring multiple remote functions with a system of the type wherein interrogation pulses are transmitted from a central station to multiple remote transponders via a common line, and wherein each transponder responds to predetermined interrogation pulses by transmitting reply pulses representing status associated with a function monitored by that transponder, said method including the steps of:

generating a first oscillatory signal at a first frequency;

generating oscillatory signal at a second frequency;

pulsing said first oscillatory signal at a first repetition rate and transmitting the pulses as a first interrogate pulse train over said common line; and pulsing said second oscillatory signal at a second repetition rate and transmitting the pulses as a second interrogate pulse train over said common line;

wherein some of said transponders respond to pulses of said first oscillatory signal and others of said transponders respond to pulses of said second oscillatory signal.

32. A telemetry system of the type wherein a central station transmits interrogate pulses via a transmission medium to multiple remote transponders and receives reply pulses representing data from said transponders via said transmission medium, said system characterized in that said transmission medium is a two-ended coaxial cable having both ends located at said central station, and in that said central station includes means for transmitting a first sequence of interrogate pulses in one direction along said cable and a second sequence of interrogate pulses in the opposite direction along said cable.

33. A system for displaying status of functions, said display comprising: a color cathode ray tube having a continuous grid-pattern image on its screen, each grid location corresponding to a respective one of said functions, processing means responsive to received reply information for storing a signal representative of the state of each of said functions; and means responsive to said stored signals for displaying in each grid location a color representative of the state of the function corresponding to that grid location;

wherein said displayed grid pattern is bordered by a horizontal row containing number labels identifying each vertical grid column, said grid pattern also being bordered by a vertical column containing number labels identifying each horizontal grid row, said number labels being displayed by circuit means comprising means for controlling the intensities of the cathode ray beams of said cathode ray tube in predetermined areas to form individual blanked or colored elements of said number labels.

* * * * *

UNITED STATES PATENT OFFICE
CERTIFICATE OF CORRECTION

Patent No. 3,737,858              Dated June 5, 1973

Inventor(s) Loyce A. Turner and Edward A. Rollor, Jr.

It is certified that error appears in the above-identified patent and that said Letters Patent are hereby corrected as shown below:

Column 7, line 56, change "ssociated" to --associated--.

Column 37, line 59, change "downwstream" to --downstream--.

Claim 1, the last eight paragraphs in column 40 should be doubly indented.

Claim 2, the last three paragraphs in column 41 should be doubly indented.

Claim 20, line 3, change "includng" to --including--.

Claim 21, line 2, change "prisng" to --prising--.

Claim 23, the last two paragraphs should be doubly indented.

Claim 26, line 2, change "tramsitter" to --transmitter--.

Column 47, line 6, after "generating" insert --a second--.

Signed and sealed this 5th day of March 1974.

(SEAL)
Attest:

EDWARD M. FLETCHER, JR.          C. MARSHALL DANN
Attesting Officer                Commissioner of Patents